US012088652B2

(12) United States Patent
Stockhammer et al.

(10) Patent No.: US 12,088,652 B2
(45) Date of Patent: Sep. 10, 2024

(54) DEADLINE SIGNALING FOR STREAMING OF MEDIA DATA

(71) Applicant: QUALCOMM Incorporated, San Diego, CA (US)

(72) Inventors: Thomas Stockhammer, Bergen (DE); Xipeng Zhu, San Diego, CA (US); Gordon Kent Walker, Poway, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 73 days.

(21) Appl. No.: 15/765,977

(22) PCT Filed: Oct. 14, 2016

(86) PCT No.: PCT/CN2016/102194
§ 371 (c)(1),
(2) Date: Apr. 4, 2018

(87) PCT Pub. No.: WO2017/063592
PCT Pub. Date: Apr. 20, 2017

(65) Prior Publication Data
US 2018/0316740 A1 Nov. 1, 2018

(30) Foreign Application Priority Data

Oct. 16, 2015 (WO) ................ PCT/CN2015/092095

(51) Int. Cl.
*H04N 21/845* (2011.01)
*H04L 9/40* (2022.01)
(Continued)

(52) U.S. Cl.
CPC ............... *H04L 65/65* (2022.05); *H04L 9/40* (2022.05); *H04L 65/40* (2013.01); *H04L 67/02* (2013.01);
(Continued)

(58) Field of Classification Search
CPC .......... H04L 1/1835; H04L 2012/5681; H04L 2012/6489; H04L 2012/5678; H04L 47/30;
(Continued)

(56) References Cited

U.S. PATENT DOCUMENTS 6,988,144 B1  1/2006 Luken et al.
8,141,120 B2 * 3/2012 Zhang ............... H04N 21/23805
725/62

(Continued)

FOREIGN PATENT DOCUMENTS

CN  101370175 A  2/2009
CN  101420457 A  4/2009
(Continued)

OTHER PUBLICATIONS

Supplementary European Search Report—EP16854968—Search Authority—Munich—Mar. 1, 2019.
(Continued)

*Primary Examiner* — Dhairya A Patel
*Assistant Examiner* — Alex H. Tran
(74) *Attorney, Agent, or Firm* — Shumaker & Sieffert, P.A.

(57) ABSTRACT

A client device includes a memory comprising a buffer for buffering data having real-time constraints and a hardware-based processor comprising digital logic circuitry. The processor is configured to execute a real-time application configured to determine times during which the data will be available for download, determine a time at which the data is needed to prevent a buffer underrun for the buffer, and when the data is available, send a request for the data and deadline information representative of the time at which the data is needed to avoid the buffer underrun. In this manner,
(Continued)

a sending device can prioritize delivery of the requested data to prevent the buffer underrun for the client device.

24 Claims, 22 Drawing Sheets

(51) Int. Cl.
  H04L 65/40 (2022.01)
  H04L 65/65 (2022.01)
  H04L 67/02 (2022.01)
  H04N 21/262 (2011.01)
  H04N 21/433 (2011.01)
  H04N 21/44 (2011.01)
  H04N 21/643 (2011.01)
(52) U.S. Cl.
  CPC . *H04N 21/26241* (2013.01); *H04N 21/26258* (2013.01); *H04N 21/4331* (2013.01); *H04N 21/44004* (2013.01); *H04N 21/64322* (2013.01); *H04N 21/8456* (2013.01)
(58) Field of Classification Search
  CPC ............ H04L 41/0836; H04L 43/0852; H04L 47/2416; H04L 47/28; H04L 47/50; H04L 47/564; H04L 49/90; H04L 65/80; H04L 47/10; H04L 29/06523; H04L 67/322; H04L 1/0002; H04L 67/62; H04L 47/267; H04L 47/263; H04L 1/1887; H04N 21/2401; H04N 21/44004; H04N 21/658; H04N 21/8456; H04N 21/6373; H04N 21/6377; H04W 28/0278; G11B 2020/10675; G11B 2020/10814
  See application file for complete search history.

(56) References Cited

U.S. PATENT DOCUMENTS

| | | | | |
|---|---|---|---|---|
| 8,717,890 | B2* | 5/2014 | Kovvali | H04W 28/0205 |
| | | | | 455/452.2 |
| 8,745,260 | B2* | 6/2014 | Harrang | H04L 65/80 |
| | | | | 709/231 |
| 8,762,561 | B2 | 6/2014 | Kamath et al. | |
| 8,874,777 | B2* | 10/2014 | Ma | H04L 67/32 |
| | | | | 709/231 |
| 9,118,814 | B2* | 8/2015 | Janardhan | H04N 7/17318 |
| 9,131,009 | B2* | 9/2015 | Broome | H04L 5/0064 |
| 9,137,301 | B1* | 9/2015 | Dunlap | H04L 65/752 |
| 9,177,540 | B2* | 11/2015 | Serletic, II | G10H 1/383 |
| 9,432,426 | B2 | 8/2016 | Mao et al. | |
| 9,565,589 | B2* | 2/2017 | Sakoda | H04W 28/0289 |
| 9,635,077 | B2 | 4/2017 | Swaminathan et al. | |
| 9,648,385 | B2* | 5/2017 | Park | H04N 21/6175 |
| 9,712,585 | B2* | 7/2017 | Lohmar | H04L 65/80 |
| 9,723,049 | B2* | 8/2017 | De Vleeschauwer | .. H04L 65/80 |
| 9,775,163 | B2* | 9/2017 | Schierl | H04W 72/08 |
| 9,854,282 | B2* | 12/2017 | Grinshpun | H04N 21/23805 |
| 10,178,037 | B2* | 1/2019 | Appleby | H04L 47/127 |
| 10,396,913 | B2* | 8/2019 | Harrang | H04L 47/12 |
| 10,439,910 | B2* | 10/2019 | Koster | H04L 65/61 |
| 10,826,837 | B2* | 11/2020 | De Vleeschauwer | |
| | | | | H04L 65/613 |
| 2002/0009067 | A1 | 1/2002 | Sachs et al. | |
| 2002/0016850 | A1* | 2/2002 | Fritz | G06F 5/06 |
| | | | | 709/232 |
| 2004/0193762 | A1* | 9/2004 | Leon | H04N 21/44004 |
| | | | | 710/52 |
| 2004/0267956 | A1* | 12/2004 | Leon | H04L 65/80 |
| | | | | 370/395.6 |
| 2005/0025011 | A1* | 2/2005 | Gabryjelski | G11B 20/10527 |
| | | | | 369/47.33 |
| 2005/0273514 | A1* | 12/2005 | Milkey | H04L 67/62 |
| | | | | 709/228 |
| 2005/0286564 | A1 | 12/2005 | Hatley et al. | |
| 2007/0162611 | A1* | 7/2007 | Yu | H04N 21/4325 |
| | | | | 709/232 |
| 2007/0195756 | A1* | 8/2007 | Komiya | H04L 65/80 |
| | | | | 370/362 |
| 2009/0013356 | A1 | 1/2009 | Doerr et al. | |
| 2009/0172184 | A1 | 7/2009 | Wason et al. | |
| 2011/0066742 | A1 | 3/2011 | Lee | |
| 2011/0072147 | A1 | 3/2011 | Kirksey | |
| 2011/0082914 | A1 | 4/2011 | Robert et al. | |
| 2011/0239078 | A1 | 9/2011 | Luby et al. | |
| 2011/0264818 | A1* | 10/2011 | Riggert | H04L 65/4053 |
| | | | | 709/231 |
| 2012/0023254 | A1 | 1/2012 | Park et al. | |
| 2012/0042090 | A1 | 2/2012 | Chen et al. | |
| 2012/0327779 | A1* | 12/2012 | Gell | H04L 47/623 |
| | | | | 370/238 |
| 2013/0170451 | A1 | 7/2013 | Krause et al. | |
| 2013/0191511 | A1 | 7/2013 | Liu et al. | |
| 2013/0227122 | A1* | 8/2013 | Gao | H04L 65/80 |
| | | | | 709/224 |
| 2013/0271655 | A1 | 10/2013 | Krahnstoever et al. | |
| 2014/0040498 | A1 | 2/2014 | Oyman et al. | |
| 2014/0280760 | A1* | 9/2014 | Hurst | H04N 21/23805 |
| | | | | 709/219 |
| 2014/0282792 | A1* | 9/2014 | Bao | H04N 21/8456 |
| | | | | 725/116 |
| 2014/0358267 | A1 | 12/2014 | Littlejohn et al. | |
| 2015/0146778 | A1* | 5/2015 | De Cicco | H04N 19/115 |
| | | | | 375/240.07 |
| 2016/0048406 | A1* | 2/2016 | Cucinotta | G06F 9/45558 |
| | | | | 718/1 |
| 2016/0057064 | A1* | 2/2016 | Appleby | H04L 47/28 |
| | | | | 709/219 |
| 2017/0134219 | A1* | 5/2017 | Taibi | H04L 67/02 |
| 2018/0132010 | A1* | 5/2018 | Fu | H04N 21/6373 |
| 2018/0139261 | A1* | 5/2018 | Sintorn | H04L 65/65 |

FOREIGN PATENT DOCUMENTS

| | | | | |
|---|---|---|---|---|
| CN | 101674492 A | 3/2010 | | |
| CN | 102333083 A | 1/2012 | | |
| CN | 102484741 A | 5/2012 | | |
| CN | 103747283 A | 4/2014 | | |
| CN | 103929684 A | 7/2014 | | |
| CN | 103973937 A | 8/2014 | | |
| CN | 104918072 A | 9/2015 | | |
| EP | 1760972 A1 | 3/2007 | | |
| EP | 2317727 A1 * | 5/2011 | ......... | H04L 67/2852 |
| EP | 2665239 A1 | 11/2013 | | |
| EP | 2538635 B1 * | 11/2014 | ......... | H04L 65/4084 |
| EP | 2903219 A1 | 8/2015 | | |
| EP | 2920938 A1 | 9/2015 | | |
| WO | 2010011873 | 1/2010 | | |
| WO | 2014076052 A1 | 5/2014 | | |
| WO | 2014120377 | 8/2014 | | |

OTHER PUBLICATIONS

International Search Report and Written Opinion—PCT/CN2016/102194—ISA/EPO—Dec. 30, 2016—11 pp.
International Search Report and Written Opinion—PCT/CN2015/092095—ISA/EPO—Jul. 22, 2016—12 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Fielding, et al., "Hypertext Transfer Protocol—HTTP/1.1," Network Working Group, RFC 2616, Jun. 1999, 114 pp.
Paila, et al., "FLUTE—File Delivery over Unidirectional Transport," Internet Engineering Task Force, RFC 6726, Nov. 2012, 46 pp.
International Preliminary Report on Patentability issued in International Application No. PCT/CN2015/092095 mailed Apr. 28, 2018, 6 pp.

(56) References Cited

OTHER PUBLICATIONS

International Preliminary Report on Patentability issued in International Application No. PCT/CN2016/102194 mailed Apr. 26, 2018, 6 pp.
EGPP TS 26.247 V13.2.0, 3rd Generation Partnership Project; Technical Specification Group Services and System Aspects; Transparent end-to-end packet switched streaming service (PSS); 3GPP file format (3GP), (Release 13), Dec. 2015, 93 pp.
"Guidelines for Implementations: DASH-IF Interoperability Points," Version 4.2; DASH Industry Forum, Apr. 9, 2018, 234 pp.
ISO/IEC 23009-1: "Information technology—Dynamic adaptive streaming over HTTP (DASH)—Part 1: Media presentation description and segment formats," Technologies de l'information—Diffusion en flux adaptatif dynamique sur HTTP (DASH)—Part 1: Description of the presentation and delivery of media formats, ISO/IEC 23009-1 International Standard, Draft Third Edition, Jan. 9, 2017, 216 pp.
3GPP TS 26.244 V12.2.0, 3rd Generation Partnership Project; Technical Specification Group Services and System Aspects; Transparent end-to-end packet switched streaming service (PSS); 3GPP file format (3GP), (Release 12), Dec. 2013, 61 pp.
EGPP TS 26.244 V9.1.0, 3rd Generation Partnership Project; Technical Specification Group Services and System Aspects; Transparent end-to-end packet switched streaming service (PSS); 3GPP file format (3GP), (Release 9), Mar. 2010, 55 pp.
ETSI TS 126 247, v10.0.0 (Jun. 2011), 3rd Generation Partnership Project; Universal Mobile Telecommunications System (UMTS); LTE; Transparent end-to-end Packet-switched Streaming Service (PSS); Progressive Download and Dynamic Adaptive Streaming over HTTP (3GP-DASH) (3GPP TS 26.247 version 10.0.0 Release 10), 96 pages.
International Standard., "Information Technology—Dynamic Adaptive Streaming over HTTP (DASH)—Part 1: Media Presentation Description and Segment Formats", ISO/IEC 23009-1, Second Edition, May 15, 2014, 152 pp.
International Standard., "Information Technology—Coding of Audio-Visual Objects Part 12: ISO Base Media file Format", ISO/IEC 14496-12, Fourth Edition, Jul. 15, 2012, Corrected version, Sep. 15, 2012, 13 pp.
International Standard., "Information Technology—Dynamic Adaptive Streaming Over HTTP (DASH) Part 1: Media Presentation Description and Segment Formats", ISO/IEC 23009-1, First Edition, Apr. 1, 2012, 134 pp.
International Standard., "Information Technology—Dynamic Adaptive Streaming Over HTTP (DASH) Part 1: Media Presentation Description and Segment Formats, Technical Corrigendum 1", ISO/IEC 23009-1:2012, Jun. 1, 2013, 61 pp.
International Standard ISO/IEC 13818-1:2000(E), "Information Technology—Generic Coding of Moving Pictures and Associated Audio Information: Systems," Second edition, Dec. 1, 2000, pp. 1-174.
International Standard ISO/IEC 14496-12, Information Technology—Coding of audio-visual objects—Part 12: ISO base media file format, Third Edition, Oct. 15, 2008, 120 pp.
Luby et, al. "Layered Coding Transport (LCT) Building Block", IETC RFC 5651, pp. 1-42, (Oct. 2009).
Response to Written Opinion dated Mar. 21, 2016, from International application No. PCT/US2015/064055, filed on Oct. 5, 2016, 5 pp.
Response to Written Opinion dated Nov. 2, 2016, from International application No. PCT/US2015/064055, filed on Dec. 30, 2016, 4 pp.
Second Written Opinion from corresponding PCT Application Serial No. PCT/US2015/064055—ISA/EPO, dated Nov. 2, 2016 7 pp.
Stockhammer T., "Guidelines on Live Streaming," 103, MPEG Meeting; Jan. 21, 2013-Jan. 25, 2013; Geneva; (Motion Picture Expert Group or ISO/IEC JTC1/SC29/WG11),, No. m28195, Jan. 18, 2013 (Jan. 18, 2013), XP030056742, 7 pages, the whole document.
Wenger et al., "RTP Payload Format for H.264 Video," Network Working Group, RFC 3984, Feb. 2005, 78 pp.
Begen A.C., et al., "Refining the SAND Architecture and Interfaces", 109. MPEG Meeting, Jul. 7, 2014-Jul. 11, 2014, Sapporo, (Motion Picture Expert Group or ISO/IEC JTC1/SC29/WG11), No. M34538, Jul. 10, 2014 (Jul. 10, 2014), XP030062911, 4 Pages.
3GPP TS 26.234: "Universal Mobile Telecommunications System (UMTS), LTE, Transparent end-to-end Packet-Switched Streaming Service (PSS), Protocols and Codecs (3GPP TS 26.234 Version 9.3.0 Release 9)", Technical Specification, European Telecommunications Standards Institute (ETSI), 650, Route Des Lucioles, F-06921 Sophia-Antipolis, France, vol. 3GPP SA, No. V9.3.0, Jun. 1, 2010 (Jun. 1, 2010), XP014047290, pp. 1-178.

* cited by examiner

DEADLINE SIGNALING FOR STREAMING OF MEDIA DATA

This application claims priority to PCT Application No. PCT/CN2015/092095, filed Oct. 16, 2015, the entire contents of which are hereby incorporated by reference.

TECHNICAL FIELD

This disclosure relates to transport of media data.

BACKGROUND

Digital media capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like.

Digital media may be compressed prior to transmission. Video data, for example, may be compressed using video compression techniques that perform spatial prediction and/or temporal prediction to reduce or remove redundancy inherent in video sequences.

After media data has been encoded, the media data may be packetized for transmission or storage. The media data may be assembled into a media file conforming to any of a variety of standards, such as the International Organization for Standardization (ISO) base media file format and extensions thereof. The media data may further be transmitted using a computer-based network via a streaming protocol, such as Dynamic Adaptive Streaming over HTTP (DASH).

SUMMARY

In general, this disclosure describes techniques for signaling deadline information for media data. That is, a client device may signal data representative of a time at which a media file, such as a DASH segment, must be received. This time may represent the time by which the media file must be received in order to ensure smooth, continuous playout by the client device (e.g., to prevent buffer underrun).

In one example, a method of retrieving data having real-time constraints is performed by a client device having a hardware-based processor comprising digital logic circuitry executing a real-time application. The method includes determining times during which the data will be available for download, determining a time at which the data is needed to prevent a buffer underrun for a buffer of the client device, and when the data is available, sending a request for the data and deadline information representative of the time at which the data is needed to avoid the buffer underrun.

In another example, a client device for retrieving data having real-time constraints includes a memory comprising a buffer for buffering the data having the real-time constraints, and a hardware-based processor comprising digital logic circuitry. The processor is configured to execute a real-time application configured to determine times during which the data will be available for download, determine a time at which the data is needed to prevent a buffer underrun for the buffer, and when the data is available, send a request for the data and deadline information representative of the time at which the data is needed to avoid the buffer underrun.

In another example, a client device for retrieving data having real-time constraints includes means for determining times during which the data will be available for download, means for determining a time at which the data is needed to prevent a buffer underrun for a buffer of the client device, and means for sending, when the data is available, a request for the data and deadline information representative of the time at which the data is needed to avoid the buffer underrun.

In another example, a computer-readable storage medium (that is, a non-transitory computer-readable storage medium) has stored thereon instructions that cause a processor to determine times during which the data will be available for download, determine a time at which the data is needed to prevent a buffer underrun for a buffer of the client device, and when the data is available, send a request for the data and deadline information representative of the time at which the data is needed to avoid the buffer underrun.

The details of one or more examples are set forth in the accompanying drawings and the description below. Other features, objects, and advantages will be apparent from the description and drawings, and from the claims.

DETAILED DESCRIPTION

Figure 1:
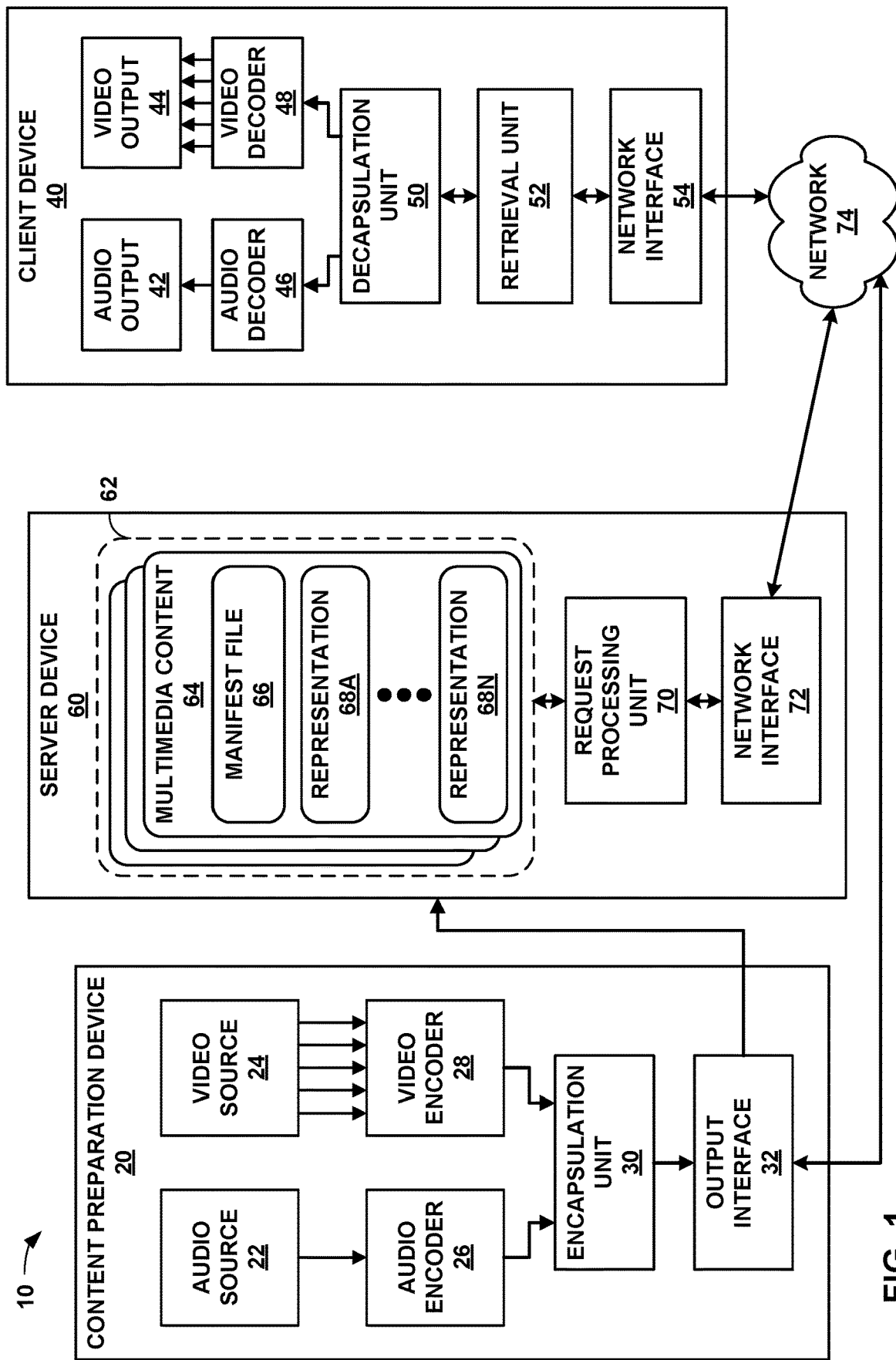
FIG. 1 is a block diagram illustrating an example system that implements techniques for streaming media data over a network.

In general, this disclosure describes techniques for signaling deadline information during streaming of media data using hypertext transfer protocol (HTTP). Such streaming techniques are also referred to herein as HTTP streaming. In particular, as explained below, this disclosure describes techniques by which a streaming client of a client device may signal deadline information to a streaming aware network element, to attempt to ensure prompt delivery of segments by respective deadlines. Similarly, the streaming aware network element may use these techniques to deliver segments to client devices such that the segments reach the client devices by their respective deadlines.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Periods may be defined by a Period element in the MPD. Each period may have an attribute start in the MPD. The MPD may include a start attribute and an availableStartTime attribute for each period. For live services, the sum of the start attribute of the period and the MPD attribute availableStartTime may specify the availability time of the period in UTC format, in particular the first Media Segment of each representation in the corresponding period. For on-demand services, the start attribute of the first period may be 0. For any other period, the start attribute may specify a time offset between the start time of the corresponding Period relative to the start time of the first Period. Each period may extend until the start of the next Period, or until the end of the media presentation in the case of the last period. Period start times may be precise. They may reflect the actual timing resulting from playing the media of all prior periods.

Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

DASH enables object-based real-time streaming delivery. In the basic operation mode, the client requests data from the server and schedules the playout. The DASH client uses buffers in order to optimize the playout and avoid buffer underruns. Also the client schedules the requests for Segments properly in order to ensure that the Segments arrive at the client in order to ensure proper playout. In the basic operation, all control and timing is with the client.

However, in certain scenarios, specifically, in the case considered in Server and Network Assisted DASH (SAND), the server and network cooperate with and assist the client in order to optimize the delivery primarily in terms of network efficiency as well as user experience. In addition, as the HTTP requests are typically handled as stateless and timeless requests in the network, the client may support the network in the delivery of objects over HTTP, especially if the network is aware of deadlines for the delivery. Such technologies are particularly relevant in cases where the network can make use of such deadlines in the delivery.

In this context, this disclosure proposes the addition of the following messages in the context of SAND:

A status message to provide an absolute deadline (wall-clock) for the requested object in the receiver.

A status message to provide a maximum RTT (duration) for the requested object.

A PED message to provide the relative deadline of the different byte ranges of the segment.

A status message to provide the relative deadline of the different byte ranges of the segment.

The techniques of this disclosure may yield certain advantages. For example, the techniques of this disclosure may provide information to a network element, such as a DASH aware network element (DANE) or a media aware network element (MANE), of timing requirements of a client device for data to be delivered to the client device. This may ensure that the client device receives the data when the data is needed by the client device, which may satisfy real-time constraints of the client device for the data. For example, in the context of DASH, media data may be required at certain times to avoid buffer underflow (that is, the client device consuming all buffered data). Buffer underflow may also be referred to as buffer underrun. Buffer underflow would generally result in needing to await reception of additional data, which may cause an undesirable pause in playback. These techniques may avoid such a pause, by avoiding the buffer underflow.

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled (without an intervening network). In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as enhanced Multimedia Broadcast Multicast Service (eMBMS). Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Although not shown in FIG. 1, network 74 may further include a streaming aware network element, such as a DASH aware network element (DANE) or a media aware network element (MANE). Retrieval unit 52 may implement the techniques of this disclosure, described in greater detail below, to advertise deadline information to the streaming aware network element of network 74.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. In some examples, one or more of video encoder 28, video decoder 48, audio encoder 26, audio decoder 46, encapsulation unit 30, retrieval unit 52, and decapsulation unit 50 may be integrated into a single fabricated chip referred to as a "system on a chip" (or "SoC"). Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
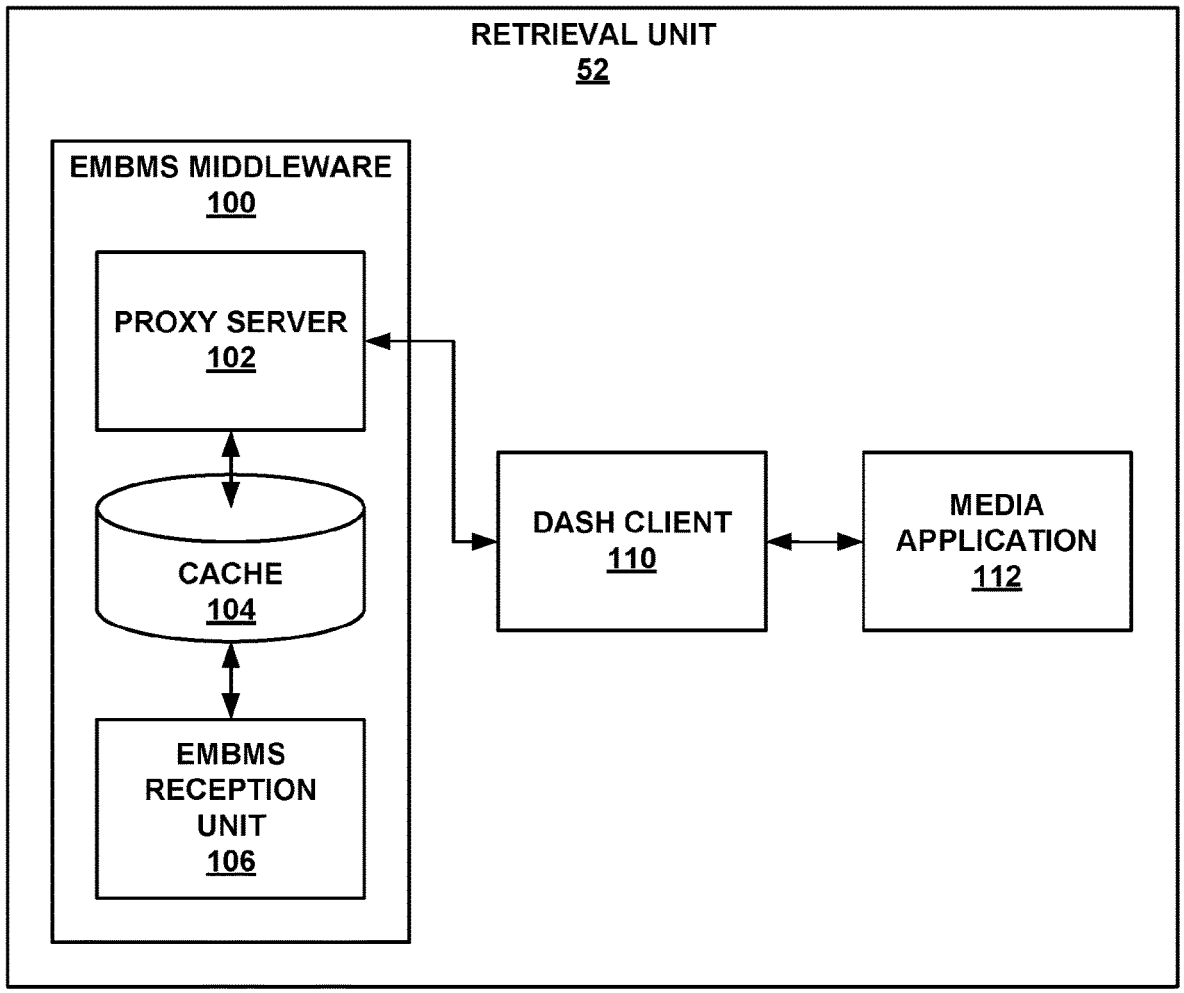
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at http://tools.ietf.org/html/rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Local server unit 102 may act as a server for DASH client 110. For example, local server unit 102 may provide a MPD file or other manifest file to DASH client 110. Local server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from local server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to local server unit 102. Local server unit 102 may retrieve requested data from cache 104 and provide the data to DASH client 110 in response to such requests.

Figure 3:
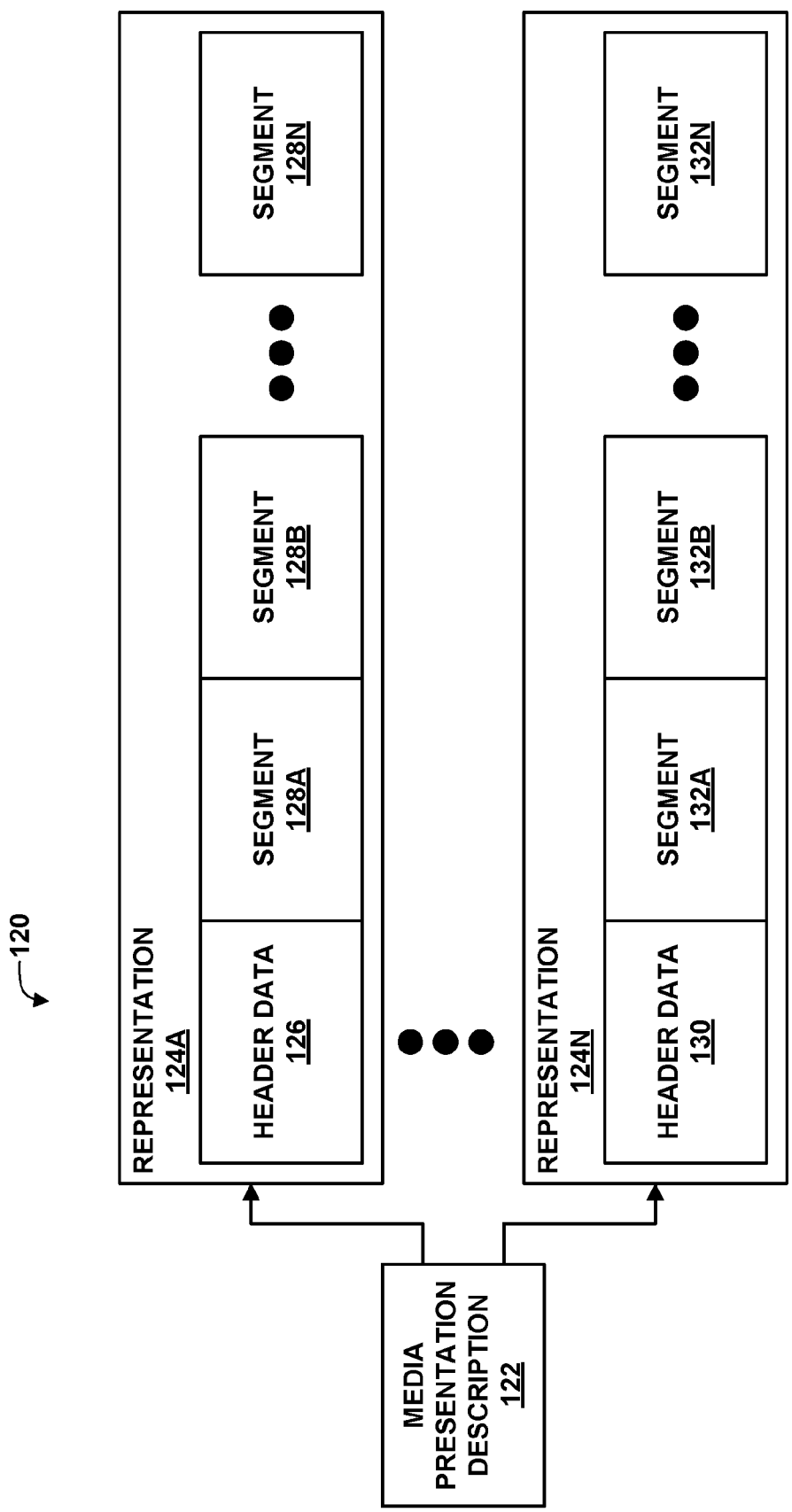
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 124 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3 GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

Figure 4:
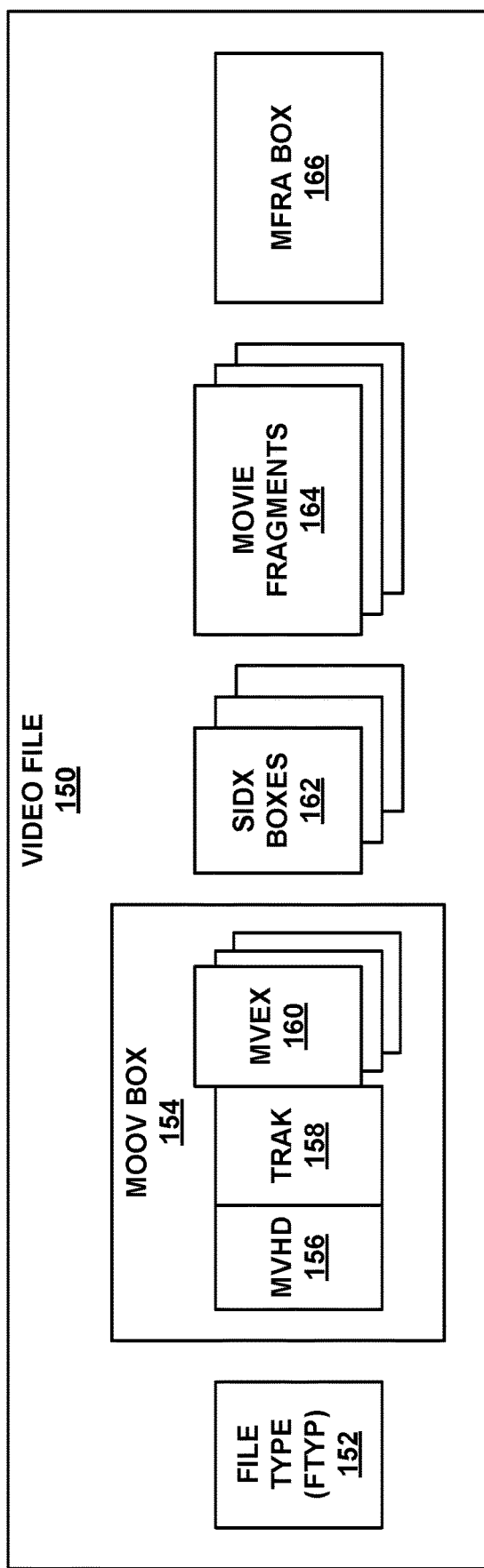
FIG. 4 is a block diagram illustrating elements of an example video file, which may correspond to a segment of a representation.

FIG. 4 is a block diagram illustrating elements of an example video file 150, which may correspond to a segment of a representation, such as one of segments 114, 124 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
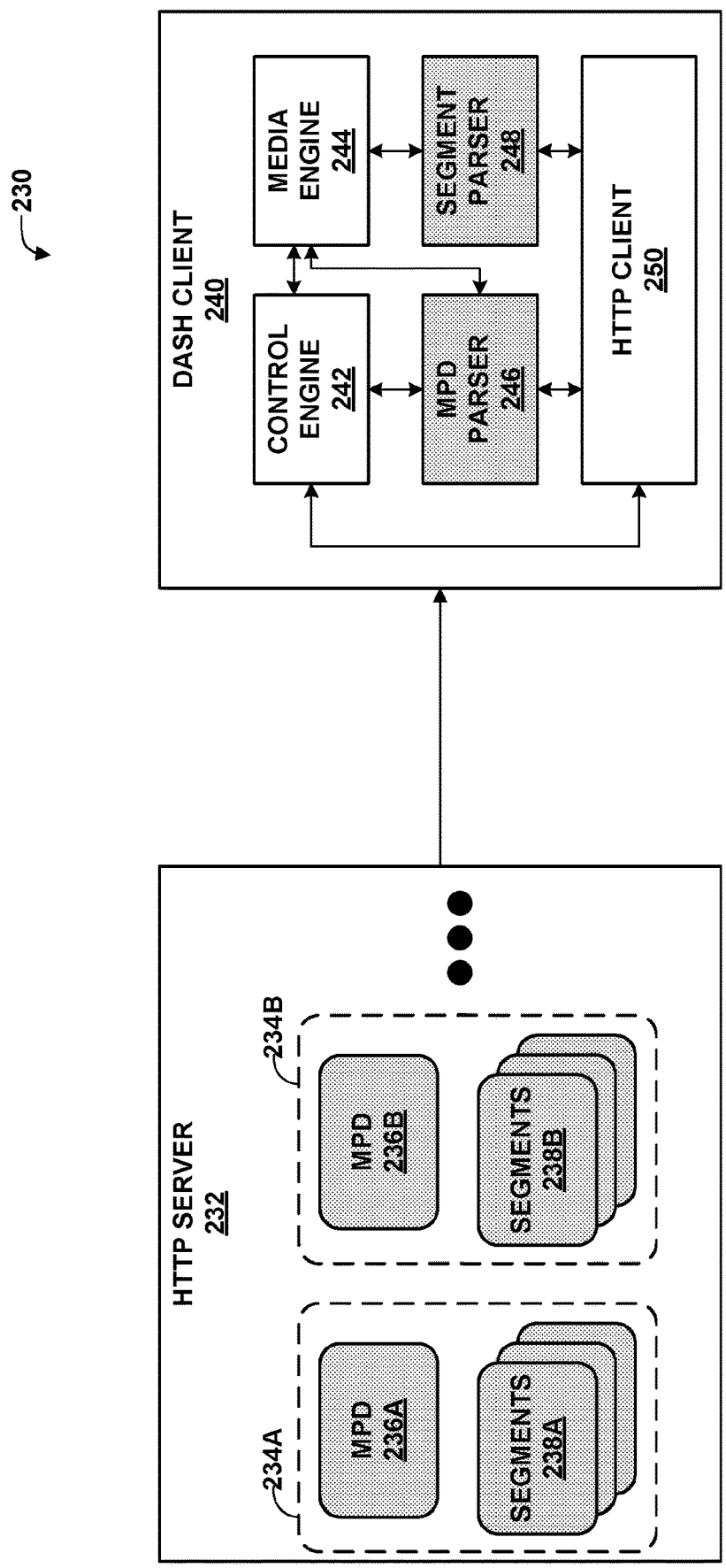
FIG. 7 is a conceptual diagram illustrating the scope of MPEG DASH.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
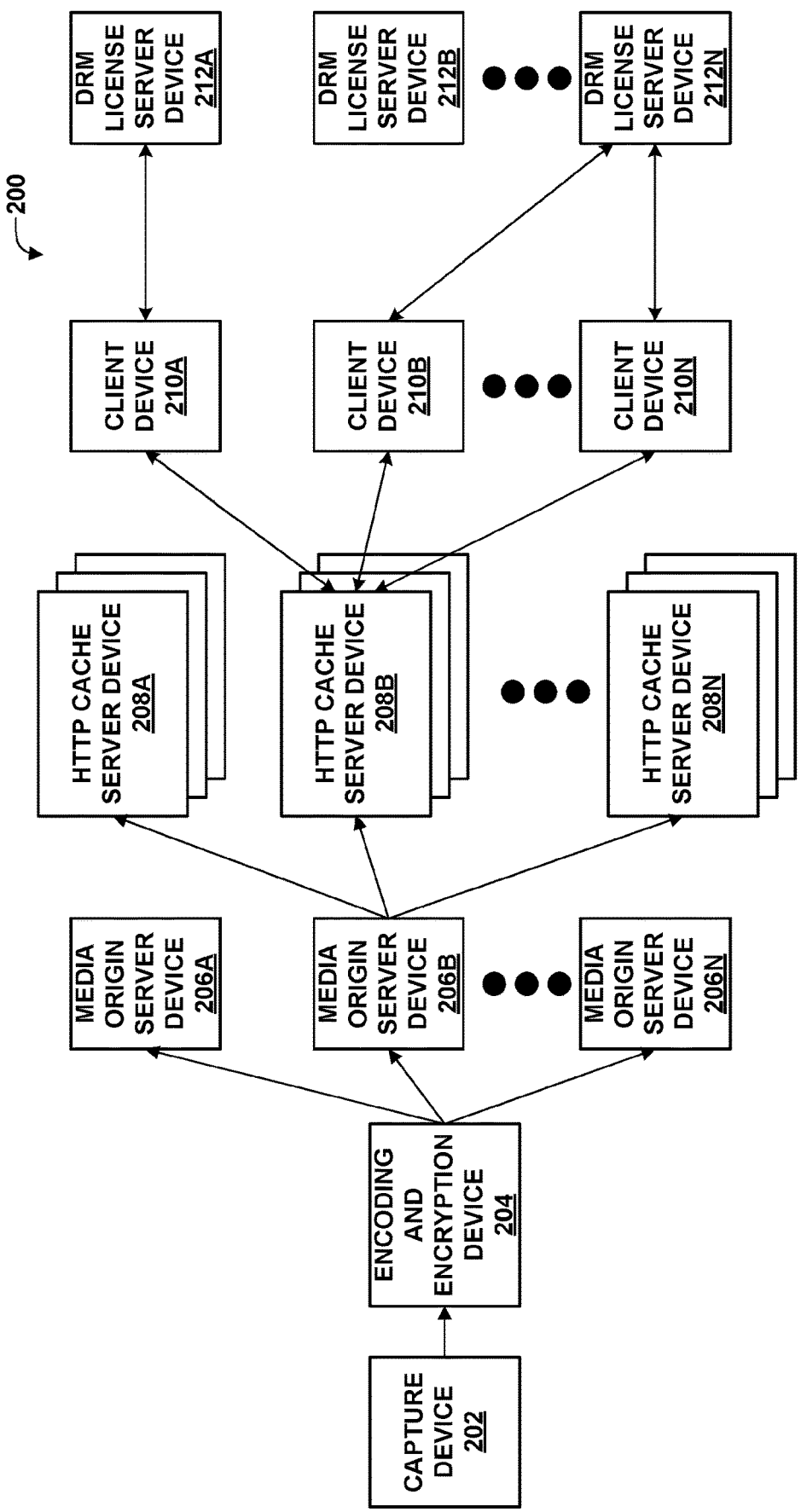
FIG. 5 is a conceptual diagram illustrating a common understanding of HTTP adaptive streaming.

FIG. 5 is a conceptual diagram illustrating a system 200 including devices configured to participate in an HTTP adaptive streaming session. In this example, system 200 includes capture device 202, encoding and encryption device 204, media origin server devices 206A-206N (media origin server devices 206), HTTP cache server devices 208A-208N (HTTP cache server devices 208), client devices 210A-210N (client devices 210), and digital rights management (DRM) license server devices 212A-212N (DRM license server devices 212). In general, capture device 202 may correspond to either or both of audio source 22 and video source 24 of FIG. 1, encoding and encryption device 204 may correspond to audio encoder 26, video encoder 28, and/or encapsulation unit 30 of FIG. 1, any or all of media origin server devices 206 and/or HTTP cache server devices 208 may correspond to server device 60 of FIG. 1, and client device 210 may correspond to client device 40 of FIG. 1.

In this example, capture device 202 captures media data (e.g., audio and/or video data). Encoding and encryption device 204 encodes the media data at multiple bitrates to form multiple sets of media data (e.g., multiple representations). Each of the sets of Encoding and encryption device 204 may split the media data into small segments, such as video file 150 of FIG. 4. Furthermore, encoding and encryption device 204 may encrypt each segment and make each segment available via an HTTP URL, via media origin server devices 206 and HTTP cache server devices 208. A client device, such as one or more of client devices 210, determines which segment(s) to download, acquires a license for the encrypted content from one of DRM license server devices 212, and then splices together and plays back the content.

Figure 6:
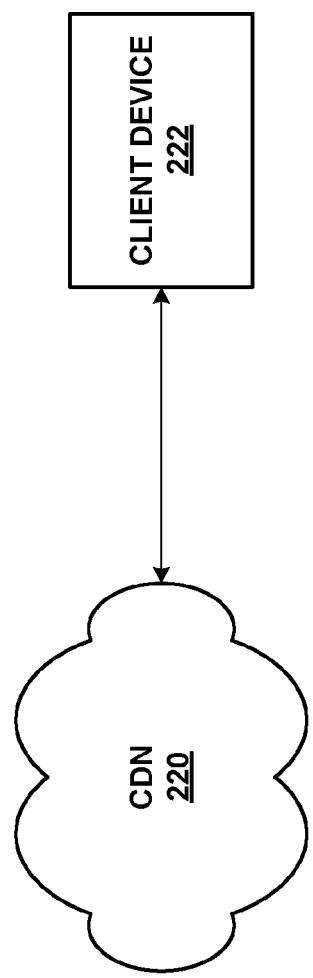
FIG. 6 is a conceptual diagram illustrating responsibilities of "smart" client devices.

FIG. 6 is a conceptual diagram illustrating responsibilities of "smart" client devices. The example of FIG. 6 illustrates an example of a content distribution network (CDN) 220 and a client device 222, representing an example "smart" client device. In this example, client device 222 manages one or more manifest files (e.g., one or more MPDs), HTTP transport, and one or more TCP connections. Client device 222 monitors or measures a playout buffer, download times and throughput of segments, local resources (such as a CPU, memory, screen, and the like), and dropped frames. Client device 222 also performs bandwidth adaptation.

FIG. 7 is a conceptual diagram illustrating a system 230 including an HTTP server 232 and a DASH client 240. System 230 is illustrated to explain the scope of MPEG DASH in such a system. In particular, in this example, HTTP server 232 stores various sets of media content, such as media content 234A and media content 234B. Media content 234A includes MPD 236A and segments 238A. Media content 234B includes MPD 236B and segments 238B. DASH client 240 includes control engine 242, media engine 244, MPD parser 246, segment parser 248, and HTTP client 250. In general, control engine 242, HTTP client 250, and MPD parser 246 may correspond to retrieval unit 52 of FIG. 1, segment parser 248 may correspond to decapsulation unit 50 of FIG. 1, and media engine 244 may correspond to audio decoder 46 and/or video decoder 48. Elements of system 230 within the scope of MPEG DASH are highlighted using grey shading. In this example, MPEG DASH has scope including MPDs 236, segments 238, MPD parser 246, and segment parser 248.

Figure 8:
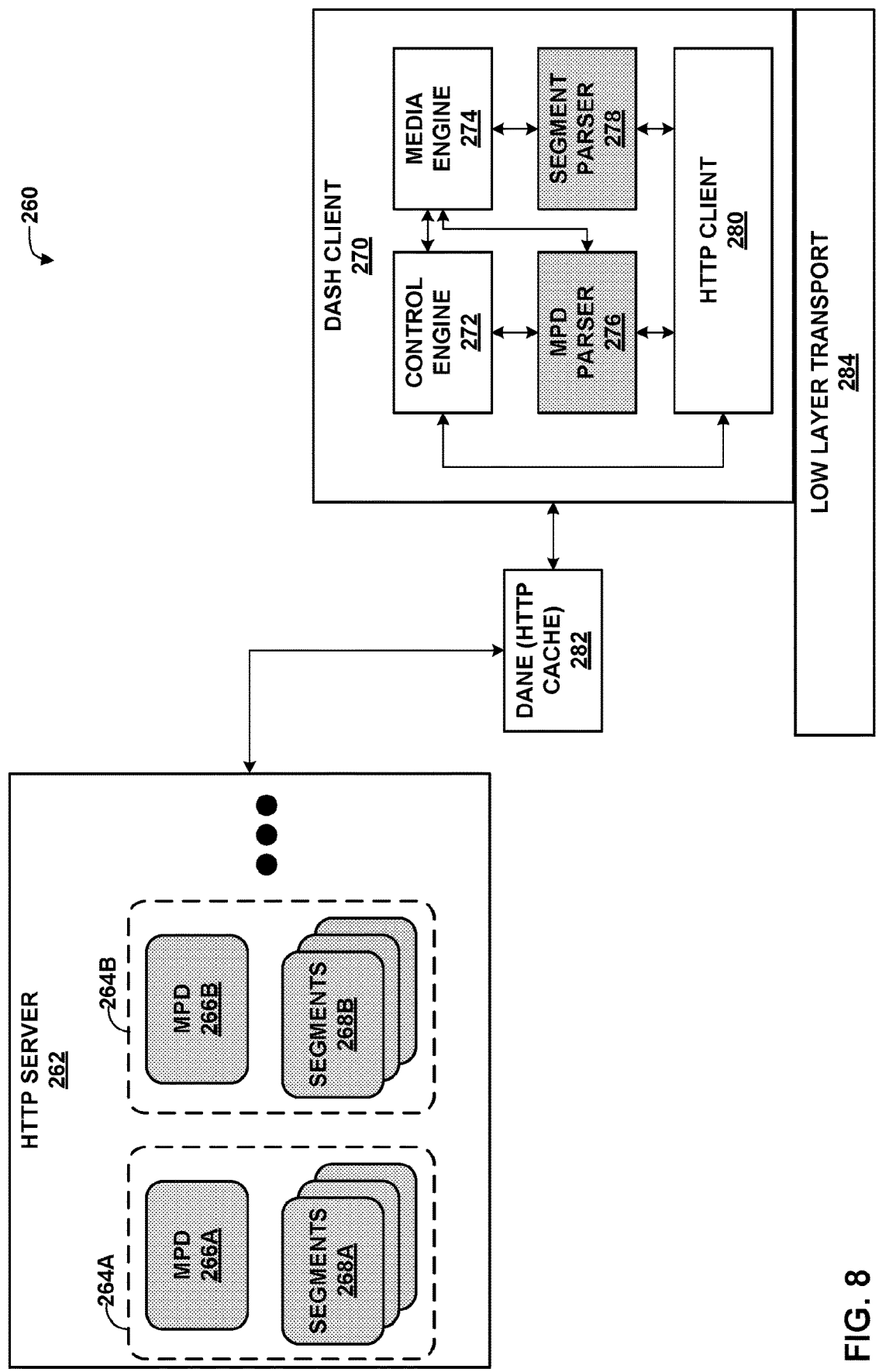
FIG. 8 is a conceptual diagram illustrating an example architecture according to the techniques of this disclosure.

FIG. 8 is a conceptual diagram illustrating an example system 260 according to the techniques of this disclosure. As shown in the example of FIG. 8, system 260 includes HTTP server 262 and DASH client 270, which are similar to HTTP server 232 and DASH client 240 of FIG. 7, respectively. That is, HTTP server 262 stores media data 264A including MPD 266A and segments 268A, and media data 264B including MPD 266B and segments 268B. Likewise, DASH client 270 includes control engine 272, media engine 274, MPD parser 276, segment parser 278, and HTTP client 280. However, system 260 further includes DASH Aware Network Element (DANE) device 282, coupled to DASH client 270 via low layer transport 284.

FIG. 8 provides a high-level architecture of the considered message flow. DASH media is stored on HTTP server 262 and delivered through an HTTP-CDN. DASH client 270 controls the session and issues HTTP requests at appropriate times. An intermediate node (e.g., DANE 282) that terminates the HTTP connection may act as a cache if DASH unaware or as a DANE, if DASH aware. DANE 282 may receive information from HTTP server 262 and/or DASH client 270 in order to optimize the delivery, for example, by providing deadline information via low layer transport 284, such that DANE 282 or other devices along low layer transport 284 may make use of the deadline information in delivery decisions for media data to be delivered to DASH client 270.

Figure 9:
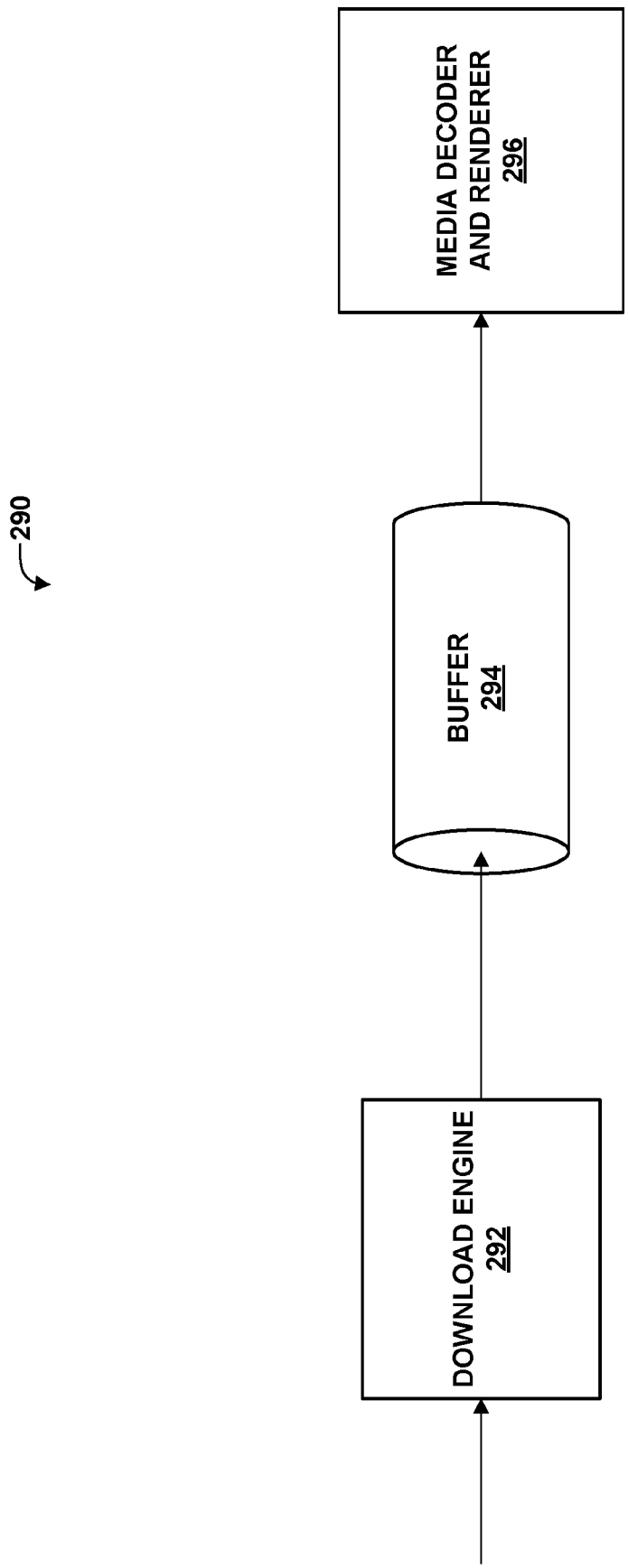
FIG. 9 is a conceptual diagram illustrating a simple client model.

FIG. 9 is a conceptual diagram illustrating a simple client model 290. Client device 40 of FIG. 1, client devices 210 of FIG. 5, client device 222 of FIG. 6, DASH client 240 of FIG. 7, and DASH client 270 of FIG. 8 may generally be configured according to client model 290. In the example of client model 290, a client includes download engine 292, buffer 294, and media decoder and renderer 296. With respect to client device 40 of FIG. 1, for example, download engine 292 and buffer 294 may be included in retrieval unit 52 and media decoder and renderer 296 may correspond to audio decoder 46, video decoder 48, audio output 42, and video output 44.

According to the descriptions in DASH-IF IOP v3.1, section 4.3.4, the DASH client acts as follows. A DASH client is guided by the information provided in the MPD, e.g., according to client model 290 shown in FIG. 9.

Assume that the DASH client has access to an MPD and can derive segment availability times for each segment from the MPD. For simplicity, it is assumed that the MPD only contains a single Period with period start time PSwc[i] and the MPD-URL does not include any fragment parameters. The following example client behavior provides a continuous streaming experience to the user:

1. The DASH client parses the MPD and selects a collection of Adaptation Sets suitable for its environment based on information provided in each of the AdaptationSet elements.
2. Within each Adaptation Set it selects one Representation, typically based on the value of the @bandwidth attribute, but also taking into account client decoding and rendering capabilities.
3. The DASH client creates a list of accessible Segments at least for each selected Representation, taking into account the information in the MPD and the current time JOIN in the DASH client, and in particular, the segment closest to the live edge referred to the live edge segment.
4. The DASH client downloads the initialization segment of the selected Representations and then accesses the content by requesting entire Segments or byte ranges of Segments. Typically, at any time, the DASH client downloads the next segment at the larger of: (i) completion of download of current segment, or (ii) the Segment Availability Start Time of the next segment. If the @availabilityTimeOffset is present, then the segments may be downloaded earlier, namely at the adjusted segment availability start time. Based on the buffer fullness and other criteria, rate adaptation is considered. Typically, the first media segment that is downloaded is the live edge segment, but other decisions may be taken in order to minimize start-up latency.
5. According to the example of FIG. 9, download engine 292 feeds retrieved media data into buffer 294, and at some point in time, media decoder and renderer 296 begins to decode and render the media data. Download engine 292 downloads, and media decoder and renderer 296 presents, the selected Representation of each selected Adaptation Set. The synchronization is done using the presentation time in the Period information signaled in the MPD. For synchronized playout, the exact presentation times in the media shall be used.
   a. Once presentation has started, the playout process is continuous. The playout process is based on the assumption that media data will be present in buffer 294 continuously. If the MPD@suggestedPresentationDelay is present in the MPD, then this value may be used as the presentation delay, PD. If the MPD@suggestedPresentationDelay is not present in the MPD, but the DASH client is expected to consume the service at the live edge, then a suitable presentation delay should be selected, typically between the value of @minBufferTime and the value of @timeShiftBufferDepth. It is recommended that the DASH client starts rendering the first sample of the downloaded media segment k with earliest presentation time EPT(k) at PSwc[i]+(EPT(k)−o[r,i])+PD.
6. The DASH client may request Media Segments of the selected Representations by using the generated Segment list during the availability time window.
7. Once the presentation has started, the DASH client continues consuming the media content, in that download engine 292 continuously requests Media Segments or parts of Media Segments, and media decoder and renderer 296 plays content according to the media presentation timeline. The DASH client may switch Representations, taking into account updated information from its environment, but this aspect is of less relevance for the discussion in this document.
8. With the wall-clock time NOW advancing, the DASH client consumes the available Segments. As NOW advances, the client possibly expands the list of available Segments for each Representation in the Period.

Certain aspects are summarized in bullets 5-7 above. The DASH client controls the scheduling of a request and the playout scheduling. At the same, the DASH client has knowledge on the latest time the next segment of a Representation needs to be available to avoid buffer underflow. The information is available at least on a good accuracy from the MPD (using the mapping of the Period timeline to the media timeline), but on an even better accuracy once the previous Segment is downloaded. More details are shown in FIG. 10 below.

Figure 10:
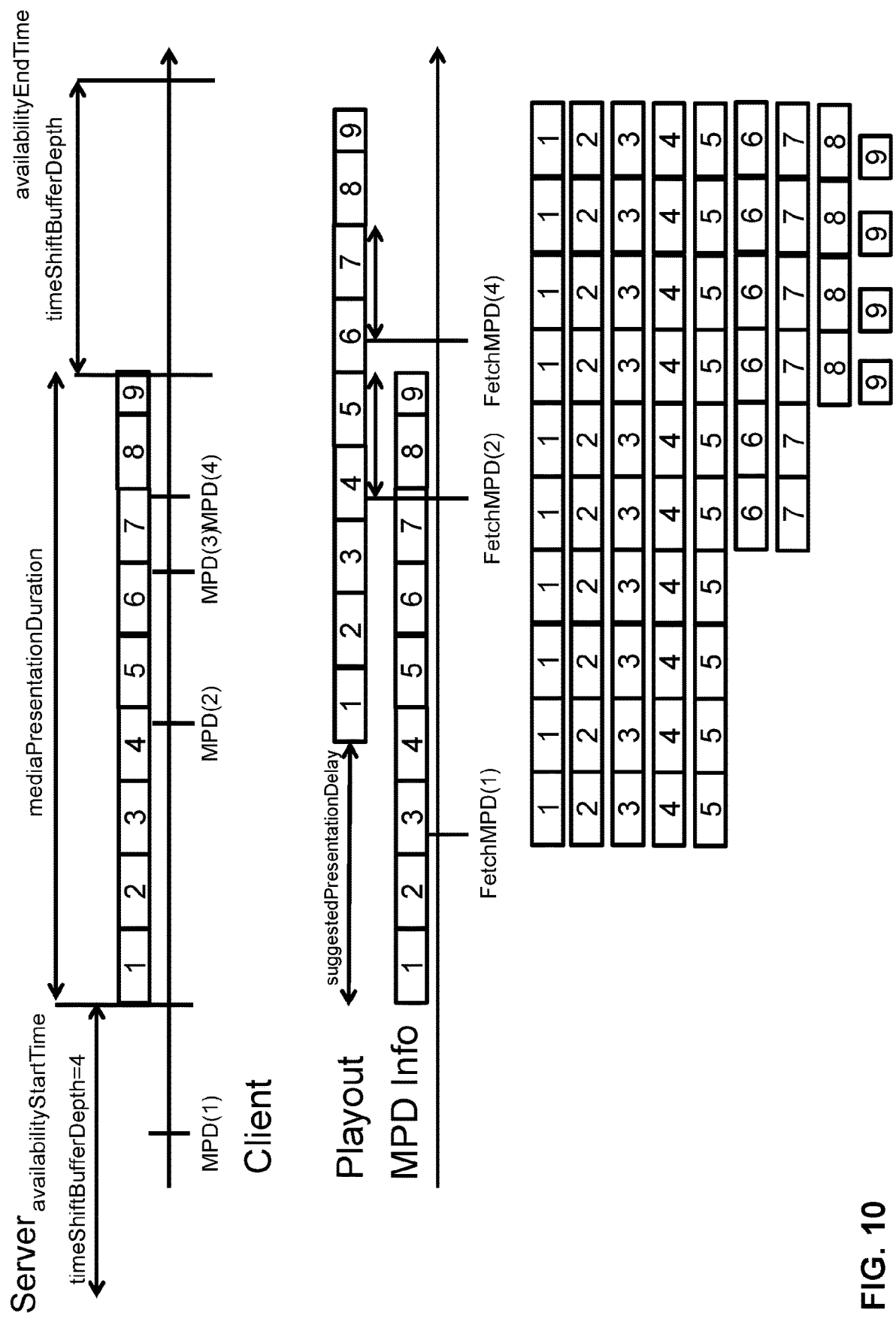
FIG. 10 is a conceptual diagram illustrating segments from the perspective of a server and a client.

FIG. 10 is a conceptual diagram illustrating segments from the perspectives of a server device and a client device. The server device makes data (e.g., segments) available and leaves the data available until a certain time (the time period during which a particular segment is available for retrieval from the server may be referred to as the "segment availability window"). The DASH client determines this information (i.e., the times of availability or segment availability window) from the MPD.

After the DASH client downloads the MPD the first time (FetchMPD(1) in FIG. 10) the DASH client determines that segments 1 and 2 are available. Furthermore, over time, more and more segments become available based on the information provided in the MPD. At some point in time after some presentation delay (using the suggested presentation delay or a client selected one), the DASH client schedules the playout and starts decoding and rendering media data of retrieved segments. Once started, the client can determine, based on the MPD and when a segment is requested, when the segment must be available in the DASH client in order to ensure smooth playout. At the same time, the DASH client can determine the latest time that the segment is still available on the server.

In accordance with the techniques of this disclosure, a DASH client (such as DASH client 270 of FIG. 8) may generate deadline information (that is, information representative of when a particular segment or other data must be received in order to satisfy real-time constraints, such as a buffer underrun) and send the deadline information back to the network in order for the network to decide on how to schedule the request. Examples are discussed below. Furthermore, DASH clients may be on a relatively good network time protocol (NTP) synchronized clock in certain circumstances. In other circumstances the synchronization may be much looser. Additionally, availability times and scheduling are also relevant for static type content, e.g., on-demand content.

Various use cases are contemplated for using deadline information. Some examples for using such deadline information include:

- A DANE is collocated with a mobile base station (together with a PGW), for example an eNB. The information for a deadline may be used by the radio scheduler to optimize the delivery in the corresponding cell using TCP/IP.
- A DANE is collocated with a home gateway. The information for a deadline, possibly from different users, may be used to optimize the requests towards network in order ensure timely delivery of urgent objects.
- A DANE is collocated with a mobile base station (together with a PGW), for example an eNB. The information for a deadline may be used by the radio scheduler to optimize the delivery in the corresponding cell using a different delivery protocol than TCP, for example a packet-based protocol.

In creating a relevant solution, the following criteria are considered:

The solution may be simple.
The solution may preferably work independent of DASH.
The solution may be part of the SAND status message framework.
The solution may be implementable for a DASH client.
The solution may enable provision of the deadline information as an absolute or a relative value.
The solution may work with regular segment requests as well as byte range requests (e.g., HTTP GET or partial GET requests).
The solution may be an optimization and work in a backward-compatible manner.

In general, a problem may arise in that in some scenarios, a buffer underrun may occur because a DASH client has not received requested media data in a timely manner. That is, for various reasons, despite a DASH client requesting media data, the media data may not be delivered in time, and thus, the contents of the DASH client's buffer may be emptied before new media data is available and ready for decoding and rendering.

The techniques of this disclosure are premised on the basic idea that the DASH client is fully aware of timing information. That is, the DASH client may determine from the manifest file (e.g., the MPD) the following information in wall clock time: when segments are available on the network and the time when each segment needs to be available at the receiver in order to be able to continue smooth playout (e.g., to prevent buffer underrun). If the DASH client provides some of this information to the DANE, the DANE may then optimize the delivery in order to ensure that the Segment is available at the receiver in time. Although for purposes of explanation the techniques are described with respect to a DASH client and a DANE, these techniques can be performed by other streaming devices (e.g., any other streaming client and a streaming aware network element).

User Equipment (UE) (that is, a client device) may report the following information to a streaming aware network element, such as a DANE:

HTTP Streaming Playout Buffer Status:
  Buffer Level (ms).
  Timestamp: The time when UE generates the buffer status information.

Playout data rate: for eNodeB (eNB) to estimate the buffer level of UE, if eNB is not DASH aware.

Deadline in wall-clock time or maximum RTT for the entire segment (object).
  UE may specify this time in each HTTP GET request.

More detailed information. For example, it may be that the initial part of the segment has different deadlines than the later part.
  Client reports deadline of initial packet.
  Object contains playout schedule for each byte range, such that intermediate node can schedule delivery of each byte range according to the information from DASH client and the playout curve.

Also report the reception mode: full segment mode or media delivery event (MDE) mode.

The client device may additionally or alternatively report playout information.

Playout schedule may be:
  Defaulted to a step function, i.e. the entire segment needs to be available.
  Reported as auxiliary information from the media/DASH server as a playout curve (byte range over time).
  Send back from the client if the client does have such information (e.g. by the segment index) to the DANE which can be used in scheduling.

Such information may be used by the scheduler to optimize the delivery of the byte ranges.

Figure 11:
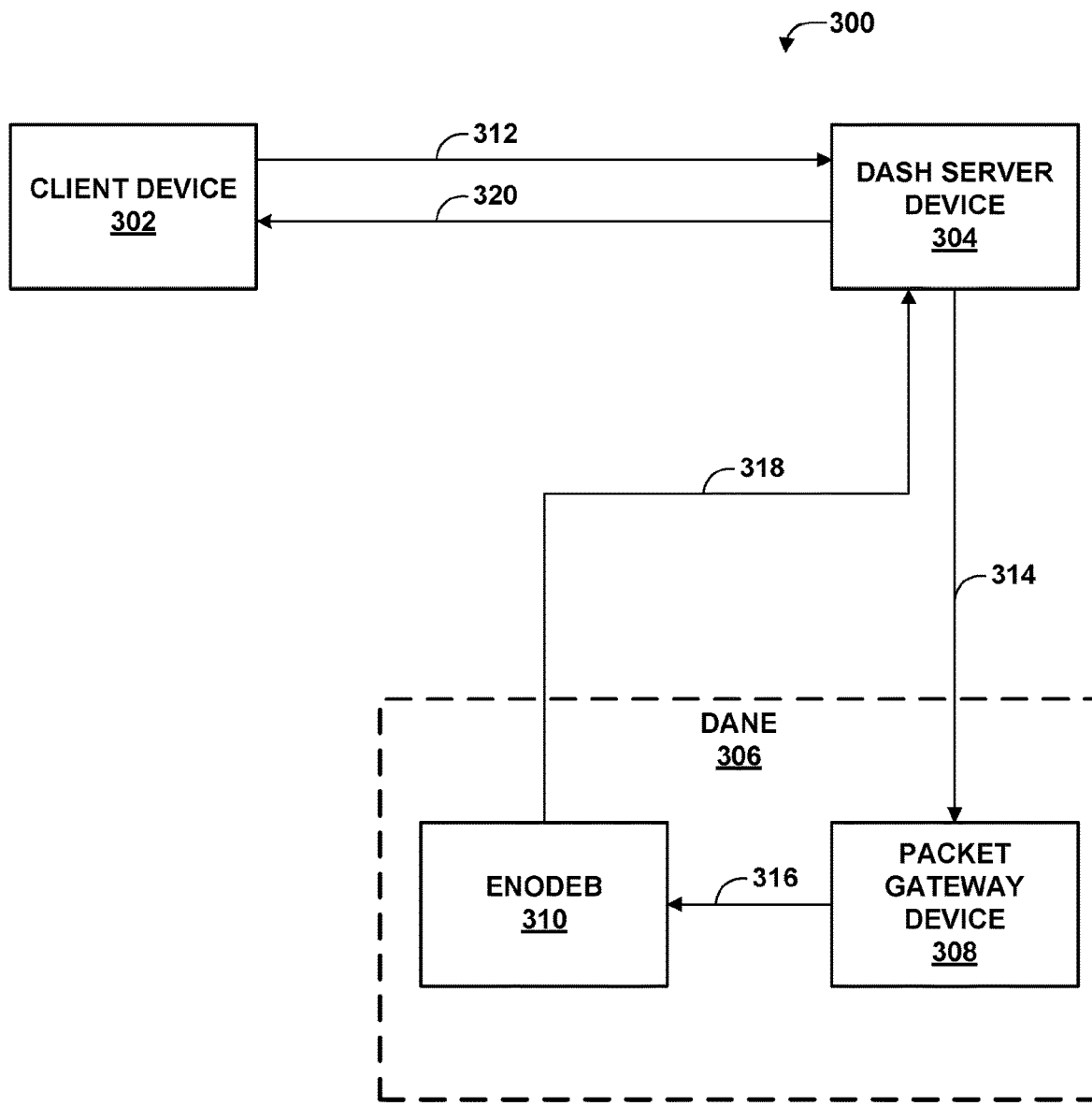
FIG. 11 is a conceptual diagram illustrating one example for video object deadline aware scheduling.

FIG. 11 is a conceptual diagram illustrating one example method for performing video object deadline aware scheduling. In this example, the method is performed by system 300, which includes client device 302, DASH server device 304, and DANE 306. DANE 306 in turn includes packet gateway (PGW) device 308 and eNodeB 310. In this example, client device 302 delivers deadline information via an HTTP request (302) to DASH server 304. In particular, client device 302 (an example of UE) reports the deadline information to the DASH server via HTTP. DASH server 304 then sends the deadline information to PGW device 308 of DANE 306 (314). Furthermore, PGW device 308 sends the deadline information to eNodeB 310 (316). Then, eNodeB 310 uses the deadline information to schedule delivery of media data (e.g., segments or MDEs) to DASH server device 304 (318), which may then send the media data to client device 302 (320), to ensure that the media data arrives at client device 302 at or before the time the media data is needed to prevent a buffer underrun of a buffer of client device 302, in accordance with the deadline information. Alternatively, eNodeB 310 may deliver the media data directly to client device 302.

In one example, there is a network tunnel between PGW device 308 and DASH server device 304 (which may correspond to a proxy server device). The deadline information may be carried in a header of tunneled packets sent according to a network tunnel protocol, such as multiprotocol label switching (MPLS).

In another example, PGW device 308 may perform selective deep packet inspection (DPI) on packets received from DASH server device 304. That is, HTTP server device 304 may include deadline information in the HTTP message. PGW device 308 may perform DPI on the packets from DASH server device 304 to retrieve the deadline information.

PGW device 308 may include deadline information in a GPRS Tunneling Protocol-U (GTP-U) header of each downlink packet sent to eNodeB 310 (that is, the base station).

eNodeB 310 may then schedule transmission of these packets per the deadline information.

In another example, client device 302 may report the deadline information to DANE 306 via HTTP. DANE 306 may also interpret the playout curve of each Segment. DANE 306 may then make this information available to the scheduler of eNodeB 310. eNodeB 310 may then use this information to optimize playout scheduling (e.g., packet delivery).

In HTTP based deadline information delivery, information (e.g., packets corresponding to a request for media data) sent form a streaming client executed by client device 302 to DANE 306 may include deadline information. The deadline information may include syntax and protocol options. These options may be included in an HTTP header extension and/or as part of query parameters in a request. Additionally or alternatively, the deadline information may be mapped to existing deployments, e.g., to HTTP/1.1 based delivery or HTTP/2.0 based delivery. Information from DASH server device 304 to DANE 306 and usage of the deadline information in this example may include a Real-Time Object Delivery over Unidirectional Transport (ROUTE) transport protocol and MDE.

In various examples, information exchanged between these various devices may define solutions to various issues. For example, semantic issues of what information is sent from the client to the network, which may include: deadline in wall-clock time for the entire segment (object), maximum RTT in milliseconds for the entire segment (object), currently available buffer in the client, and/or more detailed information (for example, it may be that the initial part of the segment has other deadlines than the later part). Similarly, syntax and protocol options may be exchanged in an HTTP Header extension in a request, as part of a query parameters in the request, or other control channels between the DASH client and the DANE. Furthermore, there may be a mapping of such information to existing deployments, such as HTTP/1.1 based delivery, HTTP/2.0 based delivery, or ROUTE transport protocol and MDE.

Figure 12:
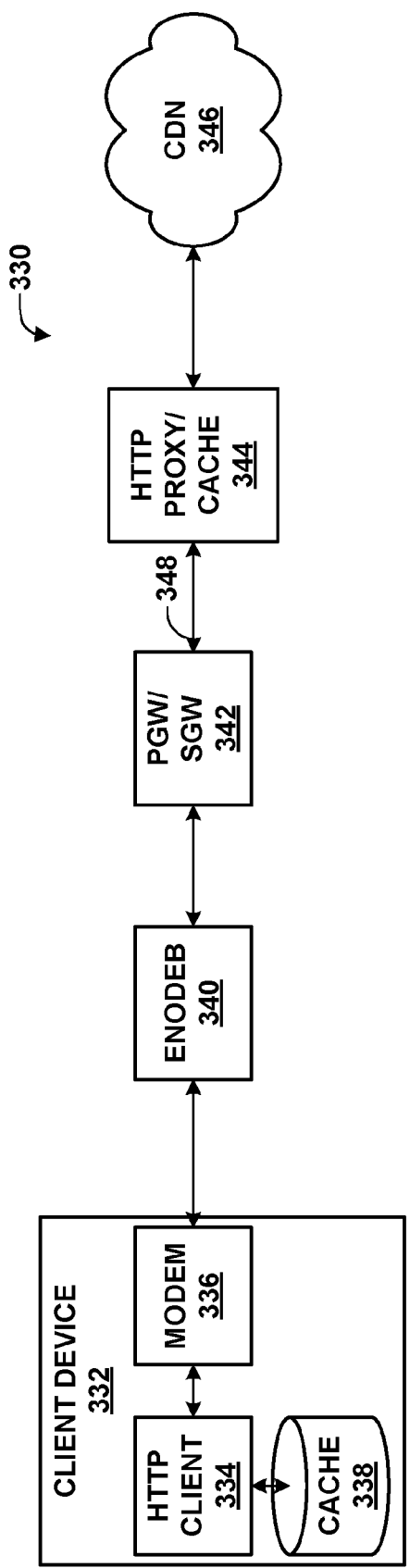
FIG. 12 is a conceptual diagram of an example implementation according to the example of FIG. 11.

FIG. 12 is a conceptual diagram of an example implementation of a system 330 that may perform the method of FIG. 11. In this example, system 330 includes HTTP proxy/cache 344 above a gateway (GW), which in this example is a packet gateway (PGW)/serving gateway (SGW) 342. In addition, system 330 includes client device 332, eNodeB 340, and CDN 346. PGW/SGW 342 and HTTP proxy/cache 344 are coupled by a Gi-LAN interface 348, in this example. Moreover, client device 332 includes modem 336, which may be configured to communicate with eNodeB 340. Client device 332 also includes HTTP client 334, which may be a streaming application executed by a hardware-based processor comprising digital logic circuitry (not shown in FIG. 12) of client device 332. Client device 332 also includes cache 338, which may represent a portion of a physical, non-transitory computer-readable medium, such as any of a variety of random access memories (RAM), a hard disk, a flash drive, or the like, for buffering retrieved media content.

Client device 332 and HTTP proxy/cache 344 may be configured to exchange deadline information in accordance with the techniques of this disclosure. That is, client device 332 may implement the deadline information reporting techniques, and HTTP proxy/cache 344 may implement deadline-based scheduling techniques, to ensure media data is available at client device 332 according to the reported deadline information. Client device 332 and HTTP proxy/cache 344 may exchange deadline information over a radio access network (RAN) from HTTP proxy/cache 344 to PGW/SGW 342 in GTP-U headers to eNodeB 340.

For example, HTTP client 334 of client device 332 may be configured to determine a playout rate of media data being retrieved from CDN 346 via HTTP proxy/cache 344. HTTP client 334 may also determine a fill level of cache 338 (that is, an amount of media data stored in cache 338). Based on the fill level of cache 338 and the playout rate, HTTP client 334 may determine a deadline by which requested media data must be received in order to prevent a buffer underrun of cache 338. HTTP client 334 may advertise deadline information representative of the deadline, e.g., in a request for media data, where the request is ultimately delivered to HTTP proxy/cache 344 and/or CDN 346. HTTP proxy/cache 344 may prioritize delivery of the requested media data according to the deadline information in order to prevent a buffer underrun of cache 338 of client device 332. Additionally or alternatively, eNodeB 340 may prioritize delivery of the requested media data according to the deadline information in order to prevent a buffer underrun of cache 338 of client device 332.

Figure 13:
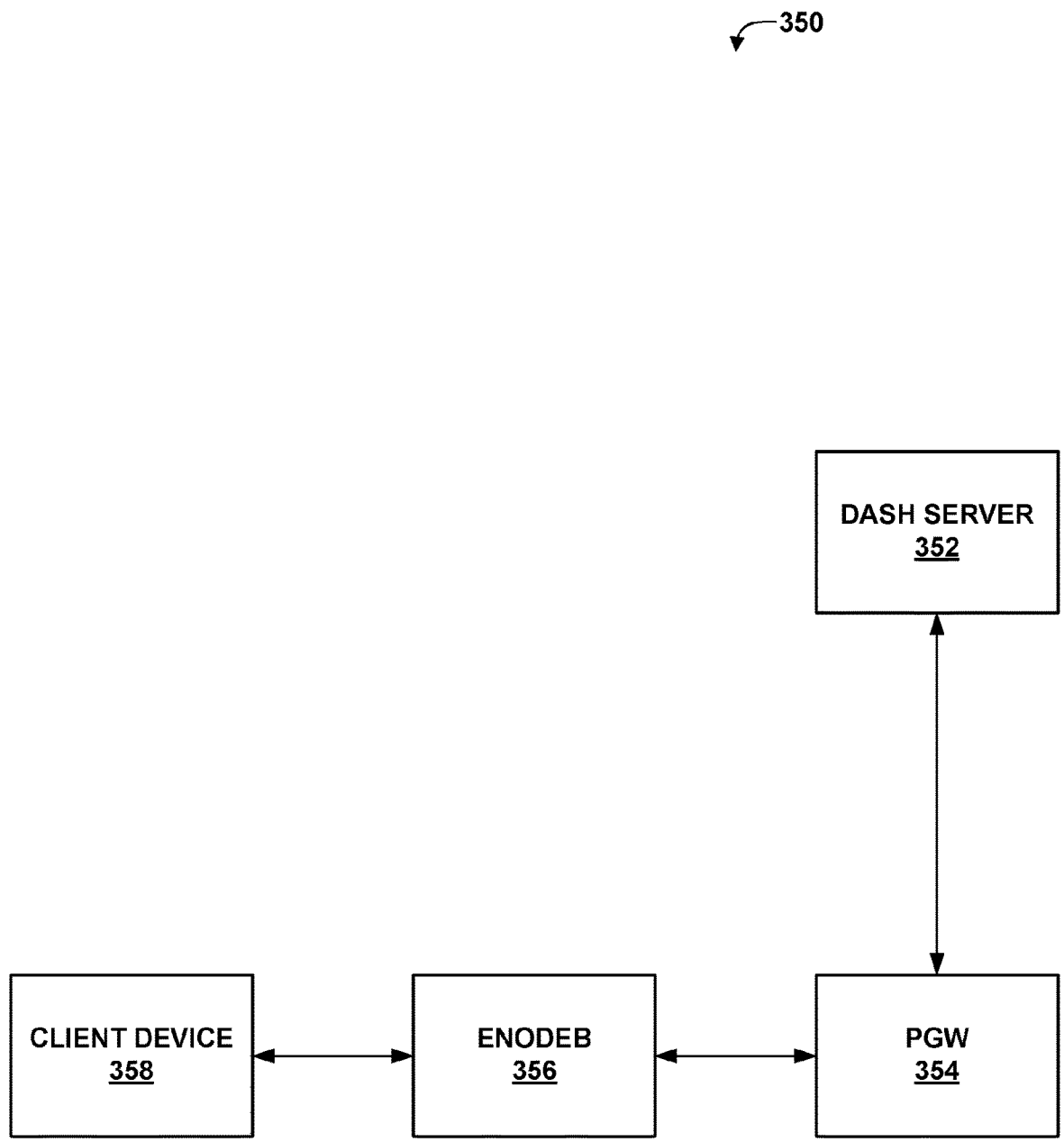
FIG. 13 is a conceptual diagram illustrating another example solution based on video object deadline aware scheduling.

FIG. 13 is a conceptual diagram illustrating another example system 350 that may implement the techniques of this disclosure for media object deadline aware scheduling. System 350 includes DASH server 352, PGW 354, eNodeB 356, and client device 358. Again, client device 358 may include components similar to client device 40 of FIG. 1, and DASH server 352 may include components similar to server device 60 of FIG. 1. In this example, client device 358 delivers DANE-specific deadline information to, e.g., eNodeB 356. In particular, client device 358 reports the deadline information to eNodeB 356 via RAN signaling, e.g., using packet data convergence protocol (PDCP) or radio resource control (RRC) protocol. Client device 358 may execute a DASH client, which may report the deadline information to a modem of client device 358 via an application programming interface (API).

After receiving the deadline information, eNodeB 356 may schedule transmissions for an HTTP streaming session between client device 358 and DASH server 352 per the deadline information. That is, DASH server 352 may receive a request for media data (e.g., all or a portion of a segment of a representation of an adaptation set) from client device 358, and send the requested media data to client device 358 via PGW 354 and eNodeB 356. Then, eNodeB 356 may prioritize delivery of the requested media data according to the deadline information previously received from client device 358.

Deadline information may be associated to downlink (DL) packets in various ways. In one example, an HTTP proxy may be logically integrated into eNodeB 356. Thus, the HTTP proxy may store a table or other data structure associating a particular deadline with requested media data (e.g., a segment number). That is, the table may include a first column representing a set of media data (such as a particular segment number), and a second column representing a deadline specified in deadline information associated with the corresponding segment. Thus, when the HTTP proxy has cached a segment identified in the first column, the HTTP proxy may prioritize delivery of the segment to client device 358 to ensure that the segment is delivered to client device 358 at or before the deadline specified in the second column of the table. In another example, a dedicated bearer channel may be established for the HTTP streaming session.

Figure 14:
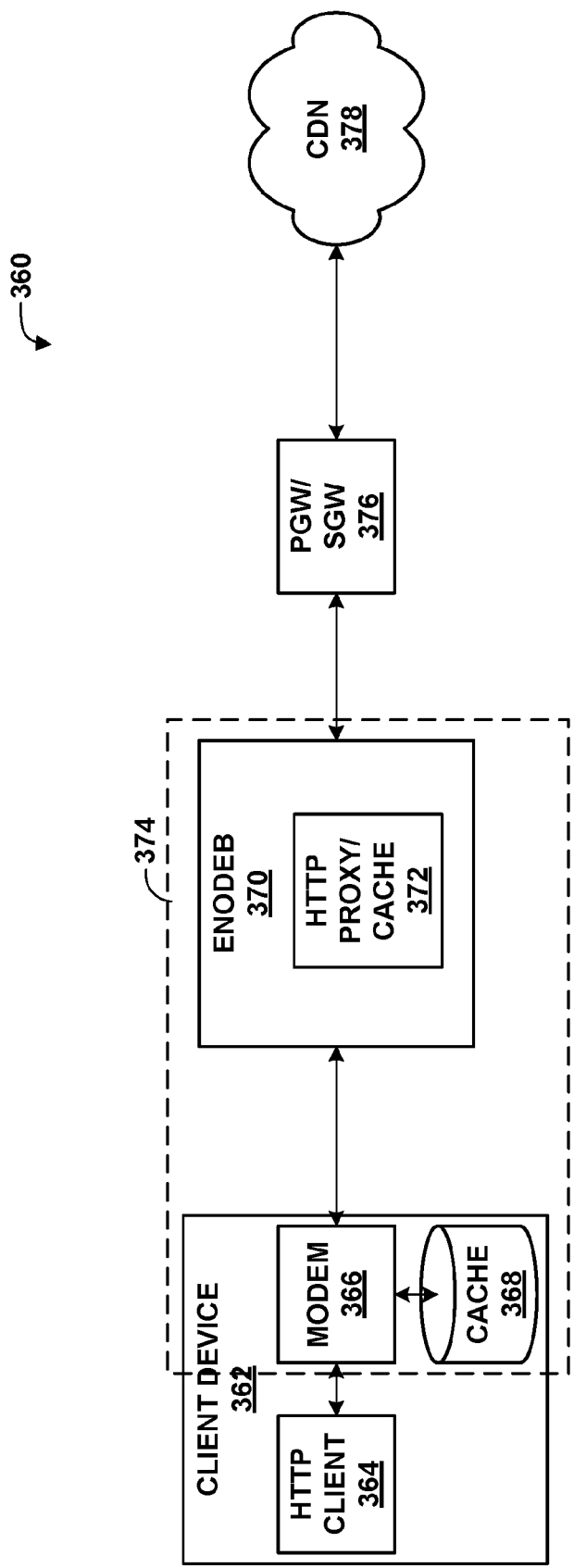
FIG. 14 is a conceptual diagram illustrating an example implementation according to the techniques of FIG. 13.

FIG. 14 is a conceptual diagram illustrating an example system 360 that may perform the method discussed above with respect to FIG. 13. In this example, system 360 includes client device 362, eNodeB 370, PGW/SGW 376, and CDN 378. Client device 362 includes HTTP client 364, modem 366, and cache 368, and eNodeB 370 includes HTTP proxy/cache 372. Thus, HTTP proxy/cache 372 of eNodeB 370 performs HTTP caching, referred to as RAN caching. Accordingly, eNodeB 370 may logically cache the content. Modem 366, cache 368, eNodeB 370, and HTTP proxy/cache 372 may collectively be referred to as an HTTP proxy 374.

Figure 15:
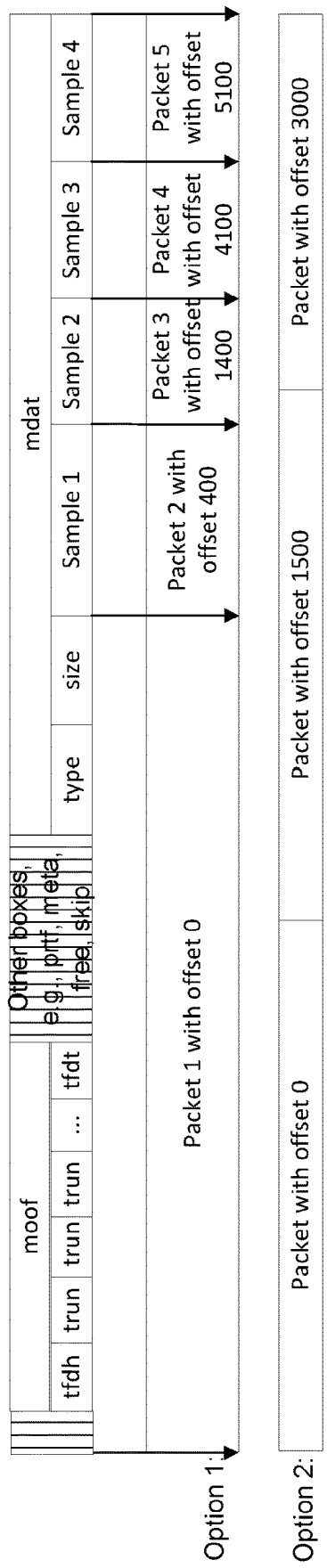
FIG. 15 is a conceptual diagram illustrating an example of packetization in accordance with the techniques of this disclosure.

Physically, HTTP Proxy/cache 372 and the memory for the cache may be outside of eNodeB 370 (e.g., as shown in FIG. 15 below). If not physically cached locally, eNodeB 370 fetches the content from CDN 378 CDN or a content server via PGW/SGW 376. This avoids exposing eNodeB 370 to the Internet directly, and also ensures service continuity via HTTP. Mobile network operators may also push content to eNodeB 370 based on predictions. Client device 362 may report deadline information to eNodeB 370 via PDCP, HTTP, or RRC.

FIG. 15 is a conceptual diagram illustrating an example of packetization in accordance with the techniques of this disclosure. In this example, playout curve metadata can be used by the sender to packetize and schedule data properly.

Figure 16:
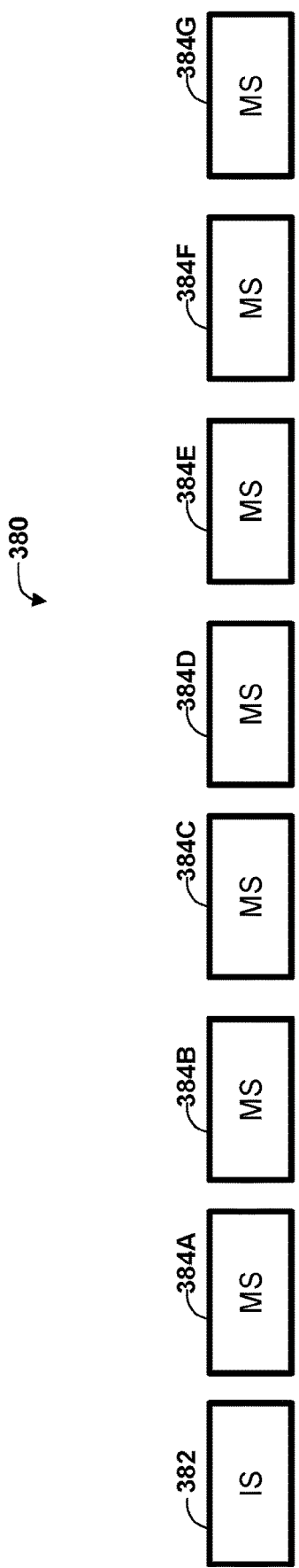
FIG. 16 is a conceptual diagram illustrating a series of segments, including an initialization segment (IS) and a plurality of media segments (MSs).

FIG. 16 is a conceptual diagram illustrating a series of segments 380, including an initialization segment (IS) 382 and a plurality of media segments (MSs) 384A-384G (MSs 384). IS 382 contains all relevant metadata, as well the media data, for one component, provides a random access point at the File Format level, and provides a size in bytes, an earliest presentation time (within ISO BMFF timeline relative to start of period) in the file format and duration information, i.e., the duration of samples it spans (within a "Period/MPU"). The in-order-concatenation of segments 382, 384 results in a conforming bitstream for the ISO BMFF.

Figure 17A:
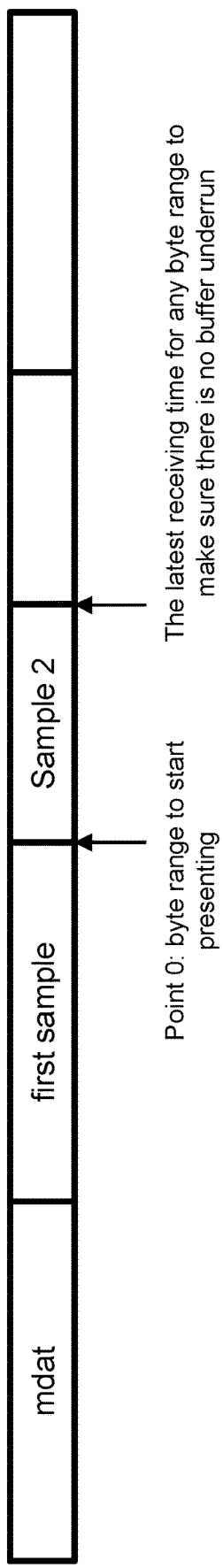
FIGS. 17A and 17B are conceptual diagrams representing a playout curve for a media segment.
Figure 17B:
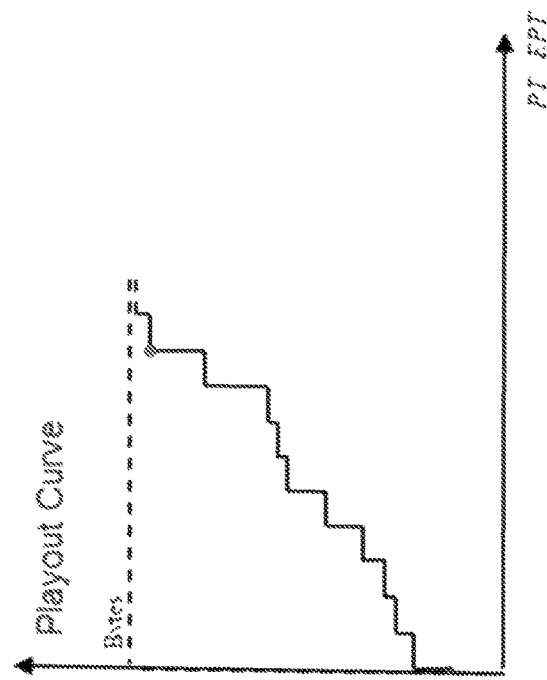

FIGS. 17A and 17B are conceptual diagrams representing a playout curve for a media segment. The playout curve expresses the amount of bytes necessary to present up to a certain time. The shape of the curve is determined by the media encoder/preparation. Examples include sample boundaries and linear increase in time. The complete segment is necessary for playout. The playout curve can be used by the transport for delivery. More metadata may be added or used for transport.

In some examples, for proper playout, an entire Segment needs to be available at the receiver. Such a model is appropriate for certain receiver implementations, but in many cases, Segments can be played "progressively," i.e., by playing and downloading at the same time. Such features are particularly relevant for low delay scenarios. The information may be provided from the client to the DANE as an extension to the simple deadline status message or it may be provided from the DASH server to the DANE as a PED.

A Media Segment may be subdivided into playable prefixes. Assuming an earliest presentation time in a segment, the playout curve expresses the amount of bytes necessary to present up to a certain time. In the "worst case," all bytes are necessary to play the earliest presentation time. In this case, only once the entire segment is available the data may be played. However, typically, with only a prefix of the entire segment, the segment can start being presented, and with continuously more bytes being added to the prefix, more and more presentation time can be played. The shape of the playout curve is determined by the media encoder/preparation. Some examples include:

Sample boundaries and linear increase in time (e.g., as shown in FIG. 17A)

Complete segment is necessary for playout

More complex structures for decoding and presentation orders are not identical, for example, when hierarchical B-pictures are used.

Two different playout curves are shown in FIG. 17B. The x-axis shows the presentation time (PT) minus the earliest presentation time (EPT) of the segment. To play the EPT, a certain amount of bytes are necessary. Whereas the dashed curve requires all bytes of the segment to play the samples with EPT, the solid curve only needs a small portion to start playing and some more data follows. The playout curve is a typical stair case.

If the network is aware of the curve, it can optimize the delivery of the related byte ranges in order to ensure timely reception of the data, assuming that the network also knows when the client needs to receive the EPT. This can be accomplished by the techniques discussed above, e.g., with respect to FIGS. 9 and 10.

Figure 18:
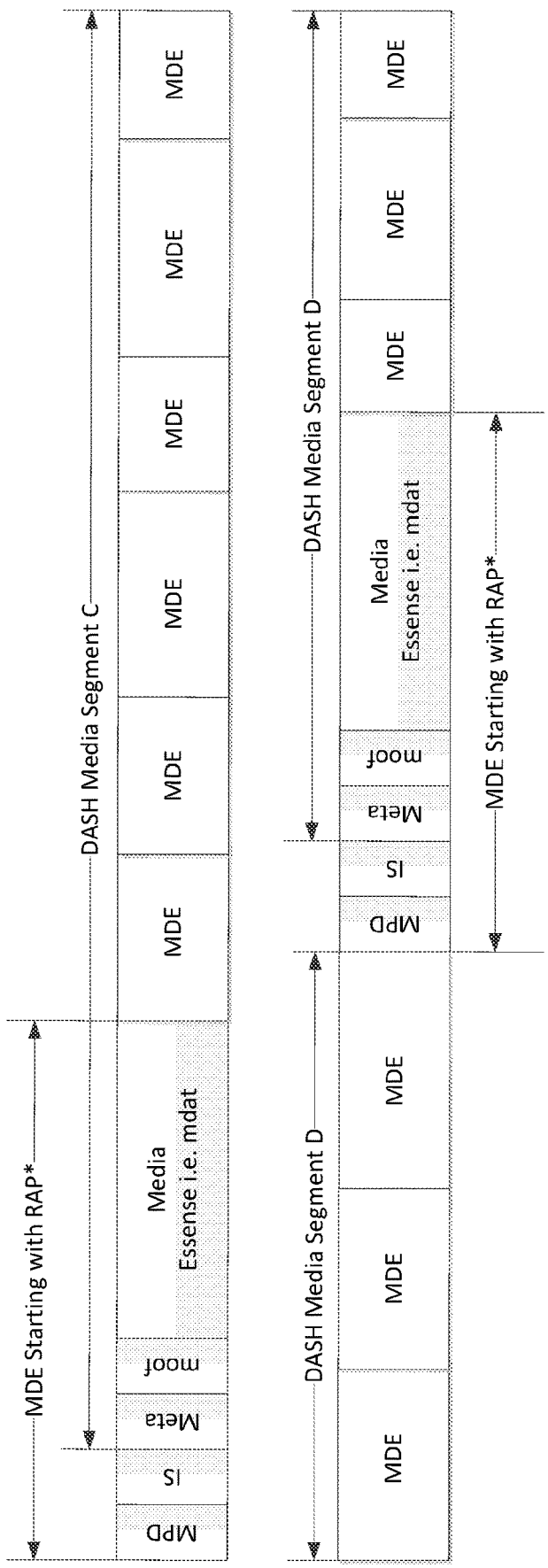
FIG. 18 is a conceptual diagram of media delivery events (MDEs) for delivering data of segments.

FIG. 18 is a conceptual diagram of media delivery events (MDEs) for delivering data of segments. MDEs starting with a random access point (RAP) that are encapsulated in IP/UDP/ROUTE become T-MDEs starting with T-RAP.

Figure 19:
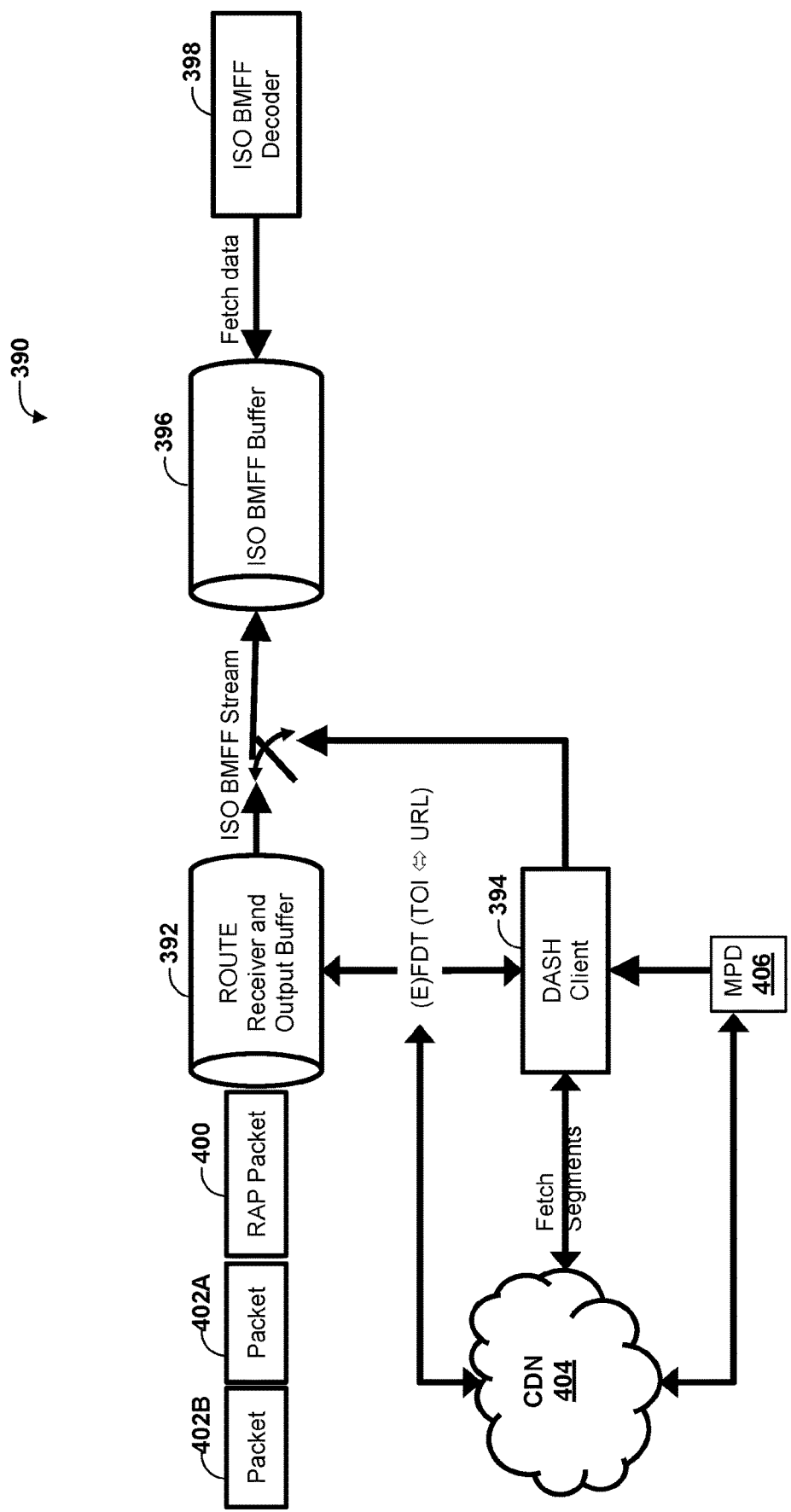
FIG. 19 is a conceptual diagram illustrating another example that may be used as a potential simplification.

FIG. 19 is a conceptual diagram illustrating another example system 390 that may be used to perform the techniques of this disclosure in a potential simplified example. In this example, system 390 includes ROUTE receiver and output buffer 392, ISO BMFF buffer 396, ISO BMFF decoder 398, DASH client 394, and CDN 404. In general, ROUTE receiver and output buffer 392 receives RAP packet 400 and packets 402A, 402B including media data via ROUTE. Additionally or alternatively, DASH client 394 retrieves segments from CDN 404 via a unicast protocol, such as HTTP. Thus, the one of ROUTE receiver and output buffer 392 or DASH client 394 that receives a particular segment provides the segment to ISO BMFF buffer 396. ISO BMFF decoder 398 retrieves the segments from ISO BMFF buffer 396 for decoding at the ISO BMFF level, e.g., to extract PES packets to be decoded by a corresponding media decoder, such as an audio decoder or video decoder. In this example, lower-layer signaling provides sufficient information to start the service without MPD 406. Only if unicast is added or if richer selection is necessary, MPD 406 is consulted. There is still a unified MPD 406, but MPD 406 is not necessary for startup and/or broadcast-only.

Figure 20:
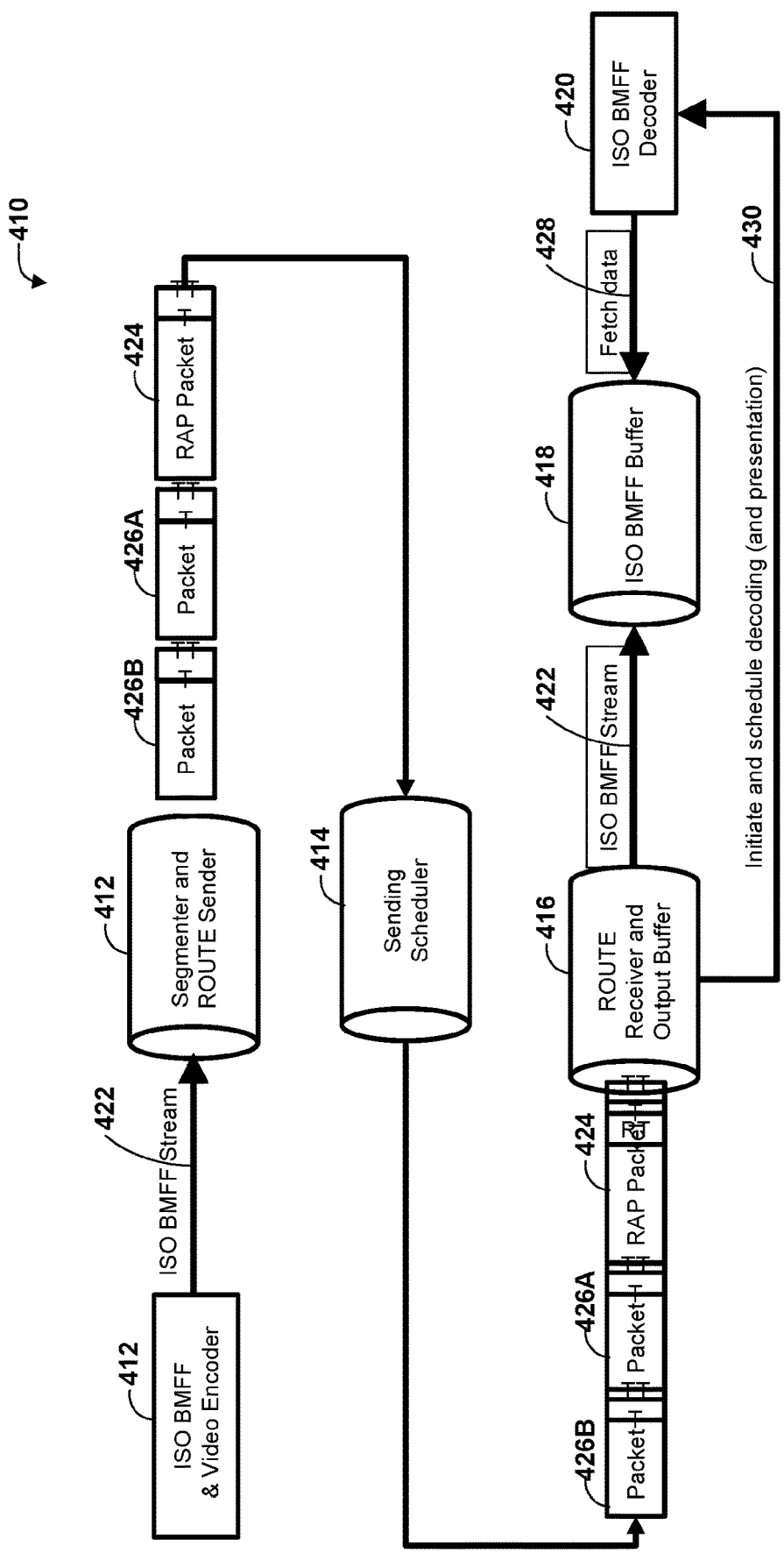
FIG. 20 is a conceptual diagram of an example delivery architecture in accordance with the techniques of this disclosure.

FIG. 20 is a conceptual diagram of an example delivery architecture 410 in accordance with the techniques of this disclosure. In this example, delivery architecture 410 includes ISO BMFF and video encoder 412, segmenter and ROUTE sender 412, and sending scheduler 414 on the server/sender side, and ROUTE receiver and output buffer 416, ISO BMFF buffer 418, and ISO BMFF decoder 420 on the client/receiver side. In general, ISO BMFF and video encoder 412 sends ISO BMFF stream 422 to segmenter and ROUTE sender 412. Segmenter and ROUTE sender 412 divides ISO BMFF stream 422 into respective packets 426A, 426B (packets 426) and random access point (RAP) packets 424, and sends the packets 424, 426 to sending scheduler 414.

Sending scheduler 414 determines when to send packets 424, 426 to ROUTE receiver and output buffer 416. After sending the packets, ROUTE receiver and output buffer 416 receives packets 424, 426 from sending scheduler 414. ROUTE receiver and output buffer 416 sends information 430 to initiate and schedule decoding and presentation to ISO BMFF decoder 420. ROUTE receiver and output buffer 416 also reconstructs ISO BMFF stream 422 from packets 424, 426, and sends ISO BMFF stream 422 to ISO BMFF buffer 418. ISO BMFF decoder 420 fetches media data 428 from ISO BMFF buffer 418 to be decoded at the ISO BMFF level, e.g., to extract PES packets including media data to be decoded by, e.g., audio and video decoders (not shown in FIG. 20).

Various examples of use cases for using progressive playout are discussed below:
- A DANE is collocated with a mobile base station (together with a PGW), for example an eNB. The information for the progressive playout may be used by the radio scheduler to optimize the delivery in the corresponding cell using TCP/IP.
- A DANE is collocated with a home gateway. The information for a progressive playout together with the deadline, possibly from different users, may be used to optimize the requests towards network in order ensure timely delivery of urgent pieces of certain objects.
- A DANE is collocated with a mobile base station (together with a PGW), for example an eNB. The information for a deadline and progressive playout may be used by the radio scheduler to optimize the delivery in the corresponding cell using a different delivery protocol than TCP, for example a packet-based protocol. FIG. 20 shows a potential delivery architecture for such a case. Segmenter and ROUTE sender 412 may act as a packetizer. Furthermore, in this example, segmenter and ROUTE sender 412 may use ROUTE as defined in ATSC, and use information from the sender (progressive playout), and possibly from the receiver (deadline information), in order to add Target Times for the packets to be sent to/received by ROUTE receiver and output buffer 416. This allows the network to use this information to ensure no buffer underrun for, e.g., ISO BMFF buffer 418.

Figure 21:
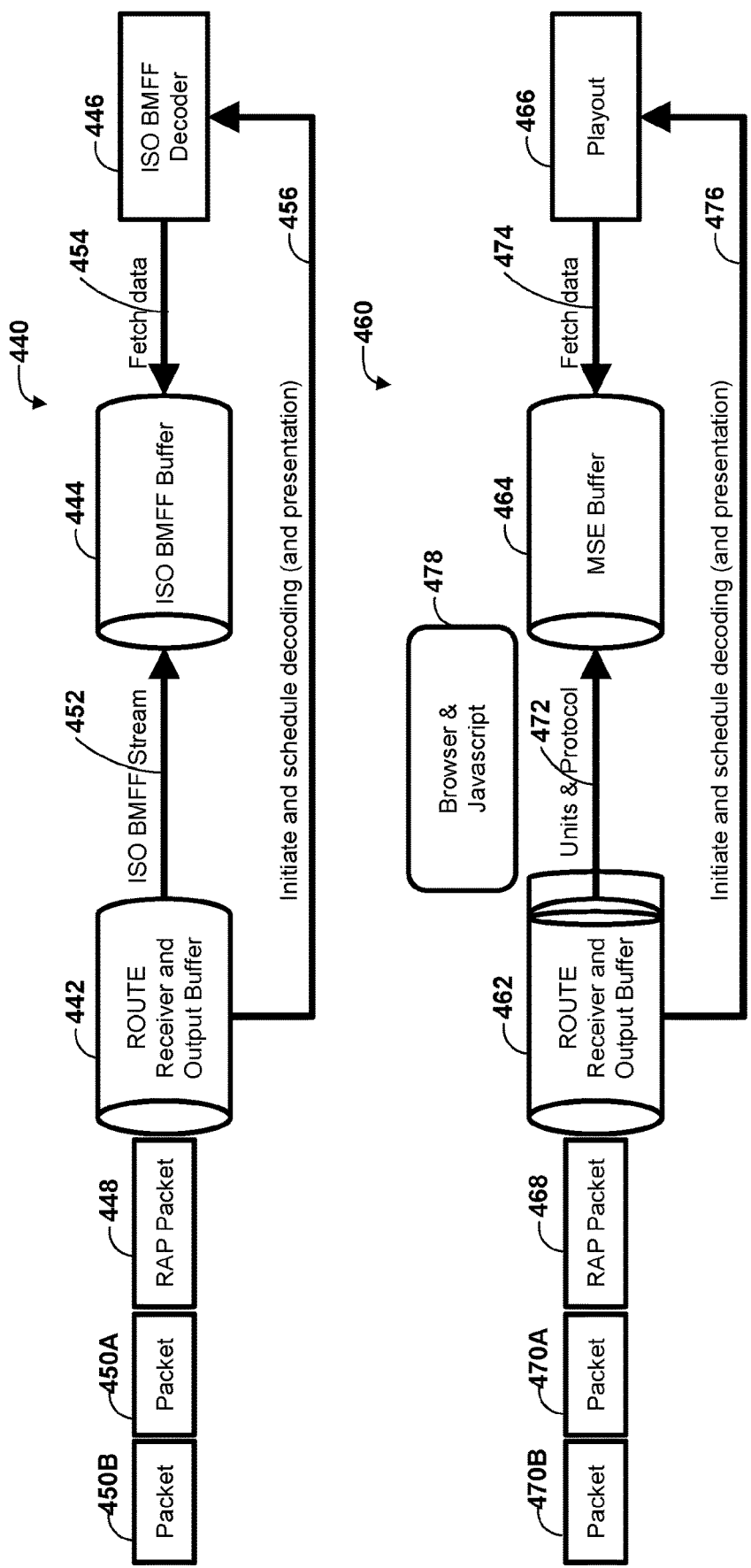
FIG. 21 is a conceptual diagram of a receiver model in accordance with the techniques of this disclosure.

FIG. 21 illustrates two conceptual diagrams of examples of receiver models in accordance with the techniques of this disclosure. The example of model 440 includes ROUTE receiver and output buffer 442, ISO BMFF buffer 444, and ISO BMFF decoder 446. ROUTE receiver and output buffer 442 receives packets 448, 450. ROUTE receiver and output buffer 442 sends information 456 to initiate and schedule decoding and presentation to ISO BMFF decoder 446. ROUTE receiver and output buffer 442 also reconstructs ISO BMFF stream 452 from packets 448, 450, and sends ISO BMFF stream 452 to ISO BMFF buffer 444. ISO BMFF decoder 446 fetches media data 454 from ISO BMFF buffer 444 to be decoded at the ISO BMFF level, e.g., to extract PES packets including media data to be decoded by, e.g., audio and video decoders (not shown in model 440 of FIG. 21).

The example of model 460 includes ROUTE receiver and output buffer 462, MSE buffer 464, browser and Javascript unit 478, and playout unit 466. ROUTE receiver and output buffer 462 receives packets 468, 470. ROUTE receiver and output buffer 462 sends information 476 to initiate and schedule decoding and presentation to ISO BMFF decoder 466. Browser 478, executed by a processor that also executes Javascript (e.g., as a plugin to browser 478) extracts media units from ROUTE receiver and output buffer 462 and delivers the media units to MSE buffer 464. Playout unit 466 fetches media data 474 from ISO BMFF buffer 464 to be decoded and presented.

In order to address the above use cases and scenarios, the following extensions may be provided and used by the various units and components of this disclsoure:
- A status message to provide an absolute deadline (wall-clock) for the requested object in the receiver. That is, the receiver (in particular, a processor of the receiver) may specify an absolute deadline, in wall-clock time, in the status message, and send this status message to, e.g., an eNodeB, an HTTP proxy, a DANE, or the like.
- A status message to provide an maximum round-trip time (RTT) (duration) for the requested object. That is, the receiver may specify a maximum RTT in the status message, and send this message to, e.g., an eNodeB, an HTTP proxy, a DANE, or the like.
- A PED message to provide the relative deadline of the different byte ranges of the segment. That is, the receiver may specify relative deadlines of different byte ranges of a segment in one or more PED messages, and send these PED messages to, e.g., an eNodeB, an HTTP proxy, a DANE, or the like.
- A status message to provide the relative deadline of the different byte ranges of the segment. That is, the receiver may specify relative deadlines of different byte ranges of a segment in one or more status messages, and send these status messages to, e.g., an eNodeB, an HTTP proxy, a DANE, or the like.

An AbsoluteDeadline parameter may be specified in deadline information. This parameter may allow DASH clients to indicate to the DANE cache the absolute deadline in wall-clock time by when the Segment needs to be received.

Source and destination for the AbsoluteDeadline parameter may be as follows:
Type: Metrics
Sender: DASH client
Receiver: DANE The table below represents an example data representation for the AbsoluteDeadline parameter:

| Parameter | Type | Cardinality | Description |
| --- | --- | --- | --- |
| AbsoluteDeadline | NTP | 1 | Absolute deadline for the segment to be available in the receiver. |

For the format of the absolute time, basically any of the following formats may be used. Example for formats of absolute time include:
xsdate format
ISO timing format
NTP format An example way to define an extension header (or header extension) in the request is as follows:
X-Dash-Deadline-ISO: <time in ISO format>
An example is as follows:
X-Dash-Deadline-ISO: 2015-10-11T17:53:03Z Additionally or alternatively, a maximum round trip time (MaxRTT) parameter may be specified in the deadline information. This parameter may allow DASH clients to indicate to the DANE cache the maximum round trip time of the request from the time when the request was issued until the requested data needs to be completely available at the DASH client. The time may be expressed in ms.

Source and destination for the MaxRTT parameter may be as follows:
Type: Metrics
Sender: DASH client Receiver: DANE The table below represents an example data representation for the MaxRTT parameter:

| Parameter | Type | Cardinality | Description |
|---|---|---|---|
| MaxRTT | Uint | 1 | Maximum RTT from the request until the Segments is available. |

An example way to define an extension header in the request is as follows:
X-Dash-MaxRTT: <maximum Round Trip time in ms>
An example is as follows:
X-Dash-MaxRTT: 2345

This example represents that in order to avoid buffer underflow, the client requests the availability of the segment 2.345 seconds after issuing the request.

Additionally or alternatively, the deadline information may include a progressive playout profile metric (ProgressivePlayout) parameter. This parameter may allow DASH clients to indicate to the DANE cache the progressive playout profile of a segment.

Source and destination for the ProgressivePlayout parameter may be as follows:
Type: Metrics
Sender: DASH client
Receiver: DANE The table below represents an example data representation for the ProgressivePlayout parameter:

| Parameter | Type | Cardinality | Description |
|---|---|---|---|
| ProgressivePlayout | Array | 1 | A list of tuples, each expressing the playout time and necessary bytes relative to the earliest presentation time in ms. |

An example way to define an extension header in the request is as follows:
X-Dash-Progressive-Playout: <tuples of bytes and times in ms>
An example is as follows:
X-Dash-Progressive-Playout:
<4321,0;62345,200;82220,400;1010101,600;121212,800;1313131;1000>

This example represents that 4321 bytes need to be delivered to initiate playout and then the total amount of bytes for each of the playout times. Note that the steps may also be expressed as Deltas.

The ProgressivePlayout information may additionally or alternatively be delivered as an extension header along with a response.

Signaling the deadline information in this manner may ensure timely delivery of data having real-time constraints, such as media data. For example, by providing the deadline information to the DANE, the DANE can ensure that data is delivered to the client device according to the real-time constraints. Thus, with respect to DASH or other streaming of media data, the client device may avoid a buffer underflow, which may ensure continuous, smooth playout.

Figure 22:
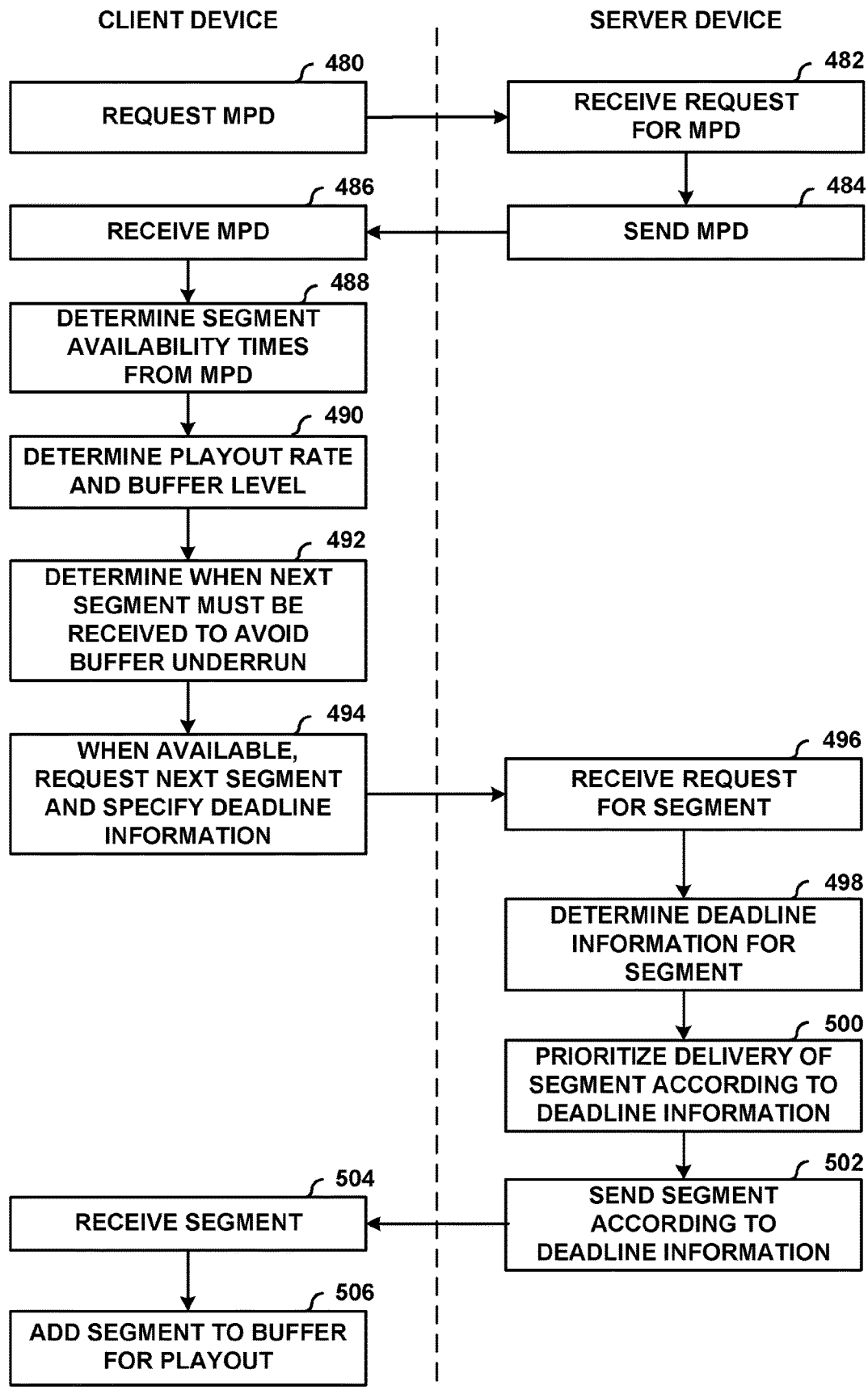
FIG. 22 is a flowchart illustrating an example method for performing the techniques of this disclosure.

FIG. 22 is a flowchart illustrating an example method for performing the techniques of this disclosure. The techniques of FIG. 22 are described with respect to server device 60 and client device 40 of FIG. 1. However, it should be understood that these or similar techniques may be performed by other devices as shown herein, such as, for example, client devices 210 and media origin server devices 206 or HTTP cache server devices 208 of FIG. 5, client device 222 and a server of CDN 220 of FIG. 6, DASH client 240 and HTTP server 232 of FIG. 7, DASH client 270 and HTTP server 262 or DANE 282 of FIG. 8, download engine 292 of FIG. 9, client device 302 and DASH server device 304 or DANE 306 of FIG. 11, client device 332 and eNodeB 340 or HTTP proxy/cache 344 of FIG. 12, client device 358 and eNodeB 356 or DASH server 352 of FIG. 13, client device 362 and eNodeB 370/HTTP proxy/cache 372 of FIG. 14, a client device configured according to system 390 of FIG. 19, a server device including segmenter and ROUTE sender 412 and sending scheduler 414 and a client device including ROUTE receiver and output buffer 416, ISO BMFF buffer 418, and ISO BMFF decoder 420 of FIG. 20, or a client device including components of either of model 440 or 460 of FIG. 21.

In this example, it is presumed that server device 60 initially prepares or receives a media presentation description (MPD) (or other manifest file, in other examples) including information specifying wall-clock times at which segments will be available. Thus, client device 40 requests the MPD from server device 60 (480). Server device 60 receives the request for the MPD (482) and, in response, sends the MPD to client device 40 (484). Accordingly, client device 40 receives the MPD (486).

Client device 40 uses the MPD to determine one or more adaptation sets from which to retrieve media data, e.g., according to decoding and rendering capabilities of client device 40 (e.g., decoding capabilities of audio decoder 46 and video decoder 48, rendering capabilities of audio output 42 and video output 44, and decoding and rendering requirements specified in, e.g., profile, tier, and/or level signaling information for the various adaptation sets). Client device 40 may then select representations of each of the adaptation sets from which to request segments, e.g., based on available amounts of network bandwidth. Client device 40 may then begin requesting segments of the selected representation(s), receive the segments, and buffer the segments as they are received.

Furthermore, in accordance with the techniques of this disclosure, client device 40 may determine the segment availability times from the MPD (488). Client device 40 may use the segment availability times to determine when the segments are available for retrieval, to avoid requesting segments that are not yet available. In addition, client device 40 may determine a playout rate and buffer fill level (490). That is, client device 40 may track how quickly the buffer is being emptied due to playback of the media data, and also monitor a current fill level of the buffer. Based on this information, client device 40 may determine when a next segment must be received in order to avoid a buffer underrun (492). In other examples, client device 40 may determine when a portion of a segment, such as a byte range, must be received, and may determine different values for different portions (e.g., byte ranges) of the segment. In general, client device 40 may calculate the time at which a segment (or portion thereof) according to the formula:

$$Deadline = CurrentTime - FillLevel/PlaybackRate,$$

where deadline is a time, in wall-clock time, at which a next segment must be received, CurrentTime is the current time in wall-clock time, FillLevel is the amount of data stored in the buffer, and PlaybackRate is the playback rate of the media data.

Thus, when the next segment is available, client device 40 may request the next segment (e.g., using an HTTP GET or partial GET request), and may further send deadline information representing the time at which the segment (or portion thereof) must be received to avoid buffer underrun (494). In some examples, client device 40 may include the deadline information within the request itself, e.g., as an attribute, in an HTTP header extension, or as an argument or element of a URL for the segment, in a header of a packet including the request, or the like, as discussed above. Alternatively, client device 40 may specify the deadline information as side information, as also discussed above. Furthermore, the deadline information may be the value "Deadline" discussed above, or may simply include the buffer fill level, a timestamp for the current time, and/or playback rate information determined by client device 40, such that server device 60 (which may represent an intermediate device, such as a DANE, eNodeB, HTTP proxy/cache, or the like) can calculate the deadline value, e.g., according to the formula above.

Server device 60 may then receive the request for the segment (496). Server device 60 may then determine the deadline information for the segment (498), e.g., from the request itself or from side information received from client device 40. Server device 60 may then prioritize delivery of the requested segment (or portion thereof, e.g., a requested byte range of the segment) according to the deadline information (500). For example, server device 60 may determine a round-trip time for data to arrive at client device 40, and schedule delivery of the requested segment (or byte range thereof) at a time that is at least one-half of the round-trip time ahead of the deadline by which the data must be received. Server device 60 may then send the requested segment (or portion thereof) according to the deadline information (that is, the prioritization) (502).

Ultimately, client device 40 may receive the segment (504) at or before the deadline by which the segment is needed to avoid a buffer underrun. Therefore, client device 40 may add the segment to the buffer for subsequent playout (506). Later, after the data in the buffer ahead of the segment has been extracted from the buffer, the segment will be extracted, decoded, and played out, by which time additional data may have been retrieved (e.g., according to the techniques of steps 488-504) and buffered, again to prevent buffer underrun.

In this manner, FIG. 22 represents an example of a method including determining times during which data will be available for download, determining a time at which the data is needed to prevent a buffer underrun for a buffer of a client device, and when the data is available, sending a request for the data and deadline information representative of the time at which the data is needed to avoid the buffer underrun.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving data having real-time constraints, the method comprising, by a real-time application executed by a hardware-based processor comprising digital logic circuitry of a client device:
   determining times during which the data will be available for download;
   determining, at a first time, a second time at which a subsequent portion of the data is needed to prevent a buffer underrun for a buffer of the client device, the first time being earlier than the second time, including:

determining a latest portion of the data included in the buffer;

determining the second time as being no later than a time at which the latest portion of the data will be played by the client device; and determining the subsequent portion of the data, the subsequent portion of the data being temporally adjacent to the latest portion of the data included in the buffer, not being present in the buffer, and being available at a third time less than the second time, the subsequent portion of the data and the latest portion of the data having a common bitrate;

determining deadline information, the deadline information comprising at least one of information representative of at least one of a wall-clock time by which the subsequent portion of the data needs to be received or a maximum round-trip time from issuing a hypertext transfer protocol (HTTP) request specifying the deadline information until the subsequent portion of the data specified in the HTTP request needs to be received;

generating the HTTP request for the subsequent portion of the data and specifying, in a query parameter of a uniform resource locator (URL) of a header of the HTTP request, the HTTP request comprising one of an HTTP GET or a partial GET request, the deadline information representative of the second time at which the subsequent portion of the data is needed to prevent the buffer underrun; and in response to the subsequent portion of the data being available at a current time equal to or greater than the third time, sending the HTTP request for the subsequent portion of the data and the deadline information representative of the second time at which the subsequent portion of the data is needed to prevent the buffer underrun to a server device.

2. The method of claim 1, wherein determining the times during which the data will be available comprises determining the times from at least one of a manifest file for the data or previously received data.

3. The method of claim 2, wherein the manifest file comprises a Dynamic Adaptive Streaming over HTTP (DASH) Media Presentation Description (MPD).

4. The method of claim 1, wherein sending the HTTP request comprises sending the HTTP request to at least one of a streaming aware network element, a DASH aware network element (DANE), a DASH server, a mobile cell site, or a wireless access point.

5. The method of claim 1, further comprising determining the deadline information, the deadline information comprising at least one of data representative of a buffer level for a buffer of the client device, a timestamp representing a time when the buffer level information was generated, or a playout data rate representing a rate at which the data is being played by the client device.

6. The method of claim 1, further comprising sending data representing at least one of a playout curve or a subsampled version of the playout curve with the deadline information.

7. The method of claim 1, wherein sending the HTTP request comprises sending the HTTP request to a streaming aware network element, the method further comprising receiving the subsequent portion of the data from the streaming aware network element at or before the second time at which the subsequent portion of the data is needed in response to sending the HTTP request and the deadline information.

8. The method of claim 1, wherein the data comprises at least one of real-time media data, streaming media data, a media segment, or a media sub-segment.

9. The method of claim 1, wherein the subsequent portion of the data comprises a media segment, and wherein sending the deadline information comprises sending data representative of whether the subsequent portion of the data is to be received as a full segment or as a plurality of media delivery events (MDEs).

10. The method of claim 1, wherein sending the deadline information comprises sending the deadline information to a streaming server via HTTP to cause the streaming server to forward the deadline information to a streaming aware network element.

11. The method of claim 1, wherein sending the deadline information comprises sending the deadline information to a streaming aware network element via a radio access network (RAN) directly.

12. A client device for retrieving data having real-time constraints, the client device comprising:

a memory comprising a buffer for buffering the data having the real-time constraints; and a hardware-based processor comprising digital logic circuitry, the processor configured to execute a real-time application configured to:

determine times during which the data will be available for download;

determine, at a first time, a second time at which a subsequent portion of the data is needed to prevent a buffer underrun for the buffer, the first time being earlier than the second time, wherein to determine the second time at which the subsequent portion of the data is needed to prevent the buffer underrun, the hardware-based processor is configured to:

determine a latest portion of the data included in the buffer;

determine the second time as being no later than a time at which the latest portion of the data will be played by the client device; and determine the subsequent portion of the data, the subsequent portion of the data being temporally adjacent to the latest portion of the data included in the buffer, not being present in the buffer, and being available at a third time less than the second time, the subsequent portion of the data and the latest portion of the data having a common bitrate;

determine deadline information, the deadline information comprising at least one of information representative of at least one of a wall-clock time by which the subsequent portion of the data needs to be received or a maximum round-trip time from issuing a hypertext transfer protocol (HTTP) request specifying the deadline information until the subsequent portion of the data specified in the HTTP request needs to be received;

generate the HTTP request for the subsequent portion of the data and specify, in a query parameter of a uniform resource locator (URL) of a header of the HTTP request, the HTTP request comprising one of an HTTP GET or a partial GET request, the deadline information representative of the second time at which the subsequent portion of the data is needed to prevent the buffer underrun; and in response to the subsequent portion of the data being available, send the HTTP request for the subsequent portion of the data and the deadline information representative of the second time at which the subsequent portion of the data is needed to prevent the buffer underrun to a server device.

13. The client device of claim 12, wherein the real-time application is configured to determine the times during which the data will be available for download from at least one of a manifest file for the data or previously received data.

14. The client device of claim 12, wherein the real-time application is configured to determine the deadline information, the deadline information comprising at least one of information representative of at least one of a wall-clock time by which the subsequent portion of the data specified in the HTTP request needs to be received or a maximum round-trip time from issuing the HTTP request until the subsequent portion of the data specified in the HTTP request needs to be received.

15. The client device of claim 12, wherein the real-time application is further configured to send data representing at least one of a playout curve or a subsampled version of the playout curve with the deadline information.

16. A device for retrieving data having real-time constraints, the device comprising:
means for determining times during which the data will be available for download;
means for determining, at a first time, a second time at which a subsequent portion of the data is needed to prevent a buffer underrun for a buffer of a client device, the first time being earlier than the second time, including:
means for determining a latest portion of the data included in the buffer;
means for determining the second time as being no later than a time at which the latest portion of the data will be played by the client device; and
means for determining the subsequent portion of the data, the subsequent portion of the data being temporally adjacent to the latest portion of the data included in the buffer, not being present in the buffer, and being available at a third time less than the second time, the subsequent portion of the data and the latest portion of the data having a common bitrate;
means for determining deadline information, the deadline information comprising at least one of information representative of at least one of a wall-clock time by which the subsequent portion of the data needs to be received or a maximum round-trip time from issuing a hypertext transfer protocol (HTTP) request specifying the deadline information until the subsequent portion of the data specified in the HTTP request needs to be received;
means for generating the HTTP request for the subsequent portion of the data and specifying, in a query parameter of a uniform resource locator (URL) of a header of the HTTP request, the HTTP request comprising one of an HTTP GET or a partial GET request, the deadline information representative of the second time at which the subsequent portion of the data is needed to prevent the buffer underrun; and
means for sending, in response to the subsequent portion of the data being available, the HTTP request for the subsequent portion of the data and the deadline information representative of the second time at which the subsequent portion of the data is needed to prevent the buffer underrun to a server device.

17. The device of claim 16, wherein the means for determining the times during which the data will be available comprises means for determining the times from at least one of a manifest file for the data or previously received data.

18. The device of claim 16, further comprising means for determining the deadline information, the deadline information comprising at least one of information representative of at least one of a wall-clock time by which the subsequent portion of the data specified in the HTTP request needs to be received or a maximum round-trip time from issuing the HTTP request until the subsequent portion of the data specified in the HTTP request needs to be received.

19. The device of claim 16, further comprising means for sending data representing at least one of a playout curve or a subsampled version of the playout curve with the deadline information.

20. A non-transitory computer-readable storage medium having stored thereon instructions that, when executed, cause a processor of a client device to:
determine times during which data will be available for download;
determine, at a first time, a second time at which a subsequent portion of the data is needed to prevent a buffer underrun for a buffer of the client device, the first time being earlier than the second time, including instructions that cause the processor to:
determine a latest portion of the data included in the buffer;
determine the second time as being no later than a time at which the latest portion of the data will be played by the client device; and
determine the subsequent portion of the data, the subsequent portion of the data being temporally adjacent to the latest portion of the data included in the buffer, not being present in the buffer, and being available at a third time less than the second time, the subsequent portion of the data and the latest portion of the data having a common bitrate;
determine deadline information, the deadline information comprising at least one of information representative of at least one of a wall-clock time by which the subsequent portion of the data needs to be received or a maximum round-trip time from issuing a hypertext transfer protocol (HTTP) request specifying the deadline information until the subsequent portion of the data specified in the HTTP request needs to be received;
generate the HTTP request for the subsequent portion of the data and specify, in a query parameter of a uniform resource locator (URL) of a header of the HTTP request, the HTTP request comprising one of an HTTP GET or a partial GET request, the deadline information representative of the second time at which the subsequent portion of the data is needed to prevent the buffer underrun; and
in response to the subsequent portion of the data being available, send the HTTP request for the subsequent portion of the data and the deadline information representative of the second time at which the subsequent portion of the data is needed to prevent the buffer underrun to a server device.

21. The non-transitory computer-readable storage medium of claim 20, wherein the instructions that cause the processor to determine the times during which the data will be available comprise instructions that cause the processor to determine the times from at least one of a manifest file for the data or previously received data.

22. The non-transitory computer-readable storage medium of claim 20, wherein the instructions that cause the processor to send the HTTP request comprise instructions that cause the processor to send the HTTP request to at least one of a streaming aware network element, a DASH aware network element (DANE), a DASH server, a mobile cell site, or a wireless access point.

23. The non-transitory computer-readable storage medium of claim 20, further comprising instructions that cause the processor to determine the deadline information, the deadline information comprising at least one of data representative of a buffer level for a buffer of the client device, a timestamp representing a time when the buffer level information was generated, or a playout data rate representing a rate at which the data is being played by the client device.

24. The non-transitory computer-readable storage medium of claim 20, further comprising instructions that cause the processor to send data representing at least one of a playout curve or a subsampled version of the playout curve with the deadline information.

\* \* \* \* \*